United States Patent
Wang et al.

(10) Patent No.: US 7,156,585 B2
(45) Date of Patent: Jan. 2, 2007

(54) METHOD AND APPARATUS FOR DRAWING A MOLE THROUGH A COMPOSITION

(75) Inventors: Yong Wang, Aurora, IL (US); Jacob E. Kupp, Waterman, IL (US)

(73) Assignee: Pettibone, LLC, Downers Grove, IL (US)

( * ) Notice: Subject to any disclaimer, the term of this patent is extended or adjusted under 35 U.S.C. 154(b) by 237 days.

(21) Appl. No.: 10/781,236

(22) Filed: Feb. 18, 2004

(65) Prior Publication Data

US 2005/0179017 A1 Aug. 18, 2005

(51) Int. Cl.
*F16L 55/18* (2006.01)

(52) U.S. Cl. ............... 405/184.1; 405/184.2; 405/184.3; 405/156; 138/97

(58) Field of Classification Search ......... 405/154.1, 405/156, 184, 184.1, 184.3, 184.4; 138/98, 138/99; 254/134.3 FT; 154/29 R
See application file for complete search history.

(56) References Cited

U.S. PATENT DOCUMENTS

| | | |
|---|---|---|
| 1,165,814 A | 12/1915 | Tadey |
| 1,876,954 A | 9/1932 | Johnson |
| 1,944,426 A | 1/1934 | Greening |
| 2,924,430 A | 2/1960 | Smith et al. |
| 3,181,202 A | 5/1965 | Lindsay |
| 3,231,240 A | 1/1966 | Naito |
| 3,265,362 A | 8/1966 | Moody |
| 3,302,932 A | 2/1967 | Wallin |
| 3,799,016 A | 3/1974 | McVaugh |
| 3,934,482 A | 1/1976 | Byers |
| 3,944,185 A | 3/1976 | Evans |
| 4,139,178 A | 2/1979 | Hippach |
| 4,292,723 A | 10/1981 | Rauscher |
| 4,505,302 A | 3/1985 | Streatfield et al. |
| 4,555,091 A | 11/1985 | May et al. |
| 4,611,787 A | 9/1986 | May et al. |
| 4,693,404 A | 9/1987 | Wayman et al. |
| 4,720,211 A | 1/1988 | Streatfield et al. |
| 4,738,565 A | 4/1988 | Streatfield et al. |
| 4,842,248 A | 6/1989 | Shy |
| 4,960,266 A | 10/1990 | McDowell et al. |
| 5,029,816 A * | 7/1991 | Langston ............ 254/134.3 FT |
| 5,205,671 A | 4/1993 | Handford |
| 5,211,509 A * | 5/1993 | Roessler ............... 254/29 R |

(Continued)

FOREIGN PATENT DOCUMENTS

GB 2213904 * 8/1989

OTHER PUBLICATIONS

Technical Support Package—Gear Bearings and Gear Bearing Transmissions—Nasa Tech Briefs GSC-14207.

(Continued)

*Primary Examiner*—Frederick L. Lagman
(74) *Attorney, Agent, or Firm*—Wood, Phillips, Katz, Clark & Mortimer

(57) ABSTRACT

A method of advancing a mole to define a passageway through a composition between first and second locations spaced from each other a substantial first distance. The method includes the steps of: attaching the mole to a cable; providing a support; providing a cable pulling assembly on the support; and operating the cable pulling assembly to cause a pulling force on the cable to be continuously applied through the cable pulling assembly to the cable and therethrough to the mole to thereby cause the mole to be advanced in a path a substantial second distance at least partially over the first distance between the first and second locations.

38 Claims, 17 Drawing Sheets

U.S. PATENT DOCUMENTS

| | | | |
|---|---|---|---|
| 5,282,696 A | | 2/1994 | Solomon et al. |
| 5,328,297 A | * | 7/1994 | Handford .................... 405/184 |
| 5,346,181 A | | 9/1994 | Cook, Jr. et al. |
| 5,482,404 A | | 1/1996 | Tenbusch, II |
| 5,507,597 A | * | 4/1996 | McConnell ................. 405/156 |
| 5,516,080 A | | 5/1996 | McVaugh |
| 5,540,294 A | | 7/1996 | Anderberg |
| 5,564,863 A | | 10/1996 | Reber |
| 5,607,280 A | | 3/1997 | Rozendaal |
| 5,613,807 A | | 3/1997 | Reber |
| 5,628,585 A | | 5/1997 | Parish, II et al. |
| 5,642,912 A | | 7/1997 | Parish, II |
| 5,649,786 A | | 7/1997 | Reber et al. |
| 5,651,639 A | | 7/1997 | Wentworth et al. |
| 5,687,807 A | | 11/1997 | Woods et al. |
| 5,816,745 A | | 10/1998 | Tenbusch, II |
| 5,895,176 A | * | 4/1999 | Puttman .................. 405/184.3 |
| 6,039,505 A | | 3/2000 | Tenbusch, II |
| 6,109,831 A | | 8/2000 | Handford |
| 6,125,950 A | | 10/2000 | Osborne |
| 6,149,349 A | * | 11/2000 | Nikiforuk et al. ....... 405/184.1 |
| 6,161,636 A | | 12/2000 | Osborne |
| 6,299,382 B1 | | 10/2001 | Wentworth |
| 6,305,880 B1 | | 10/2001 | Carter et al. |
| 6,405,833 B1 | | 6/2002 | Baranda et al. |
| 6,435,480 B1 | | 8/2002 | Allen |
| 6,443,657 B1 | | 9/2002 | Brahler |
| 6,443,658 B1 | | 9/2002 | Lincoln |
| 6,672,802 B1 | * | 1/2004 | Putnam ...................... 405/184 |
| 2002/0067954 A1 | | 6/2002 | Carter et al. |
| 2002/0110425 A1 | | 8/2002 | Hesse |
| 2003/0017008 A1 | | 1/2003 | Robinson |

OTHER PUBLICATIONS

Print-out from Website http://powerclimber.com—Hoists.

* cited by examiner

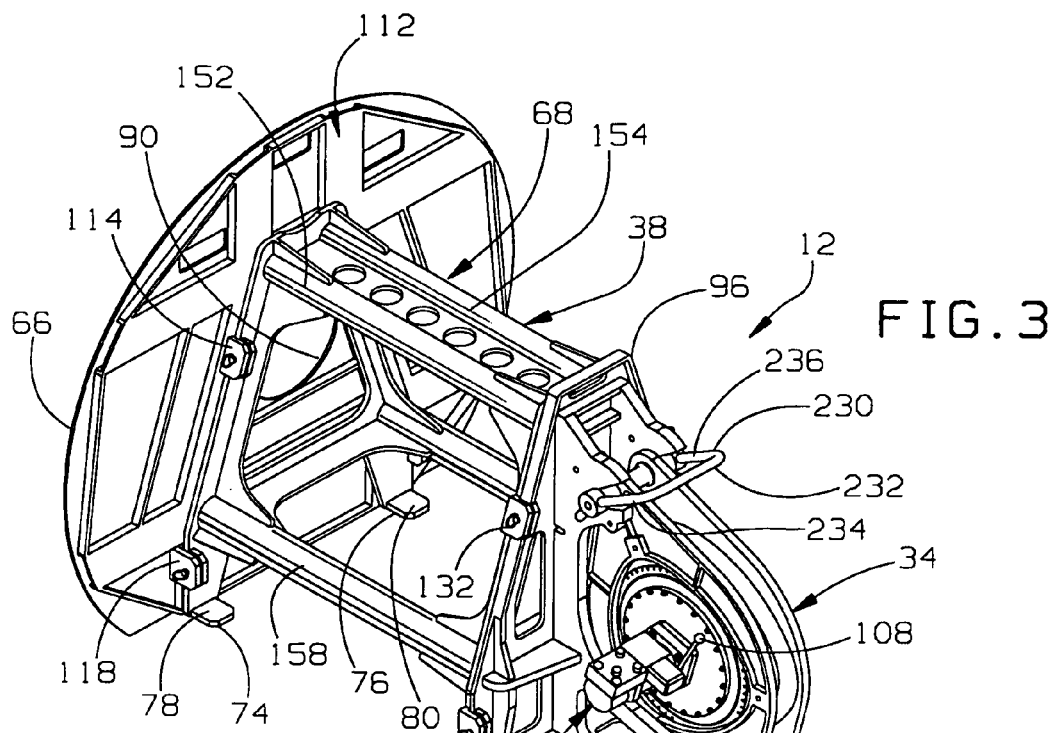
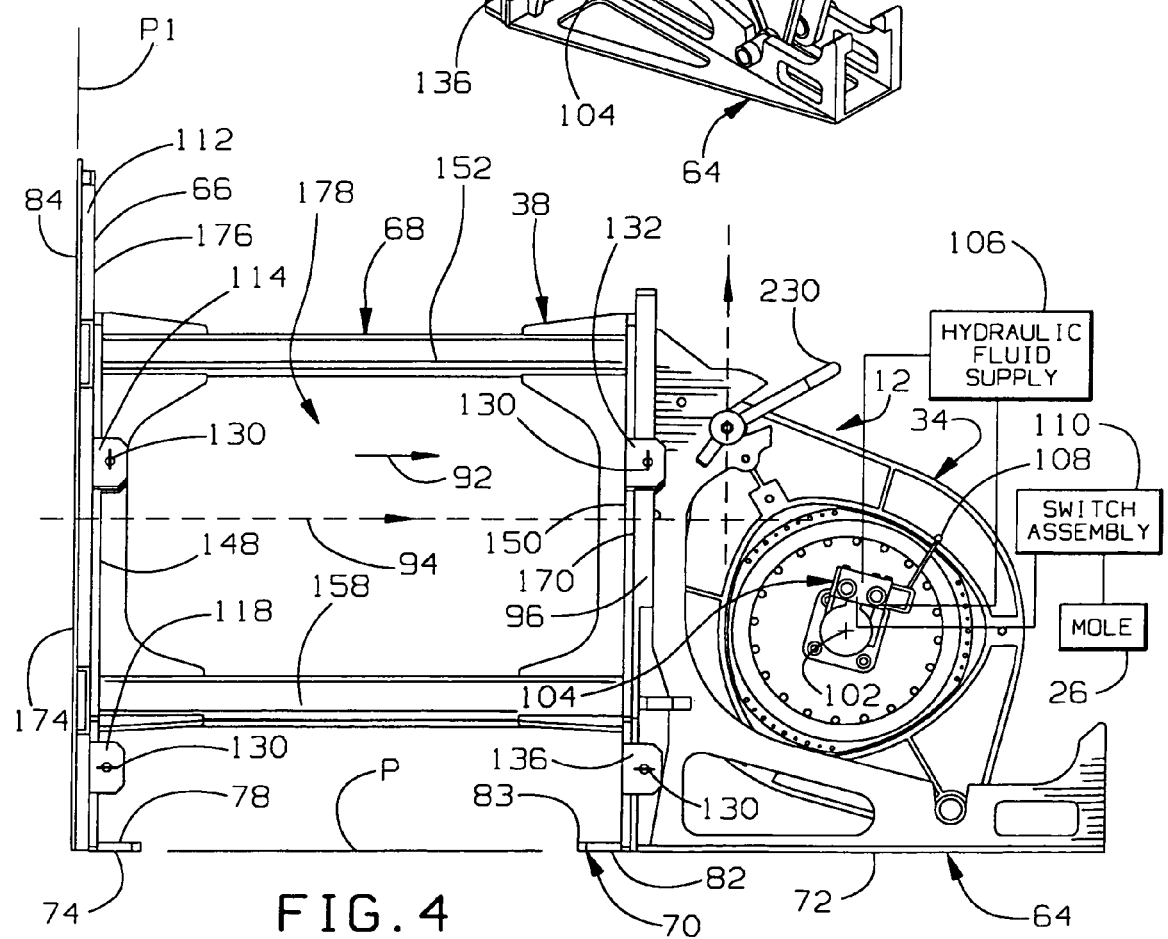

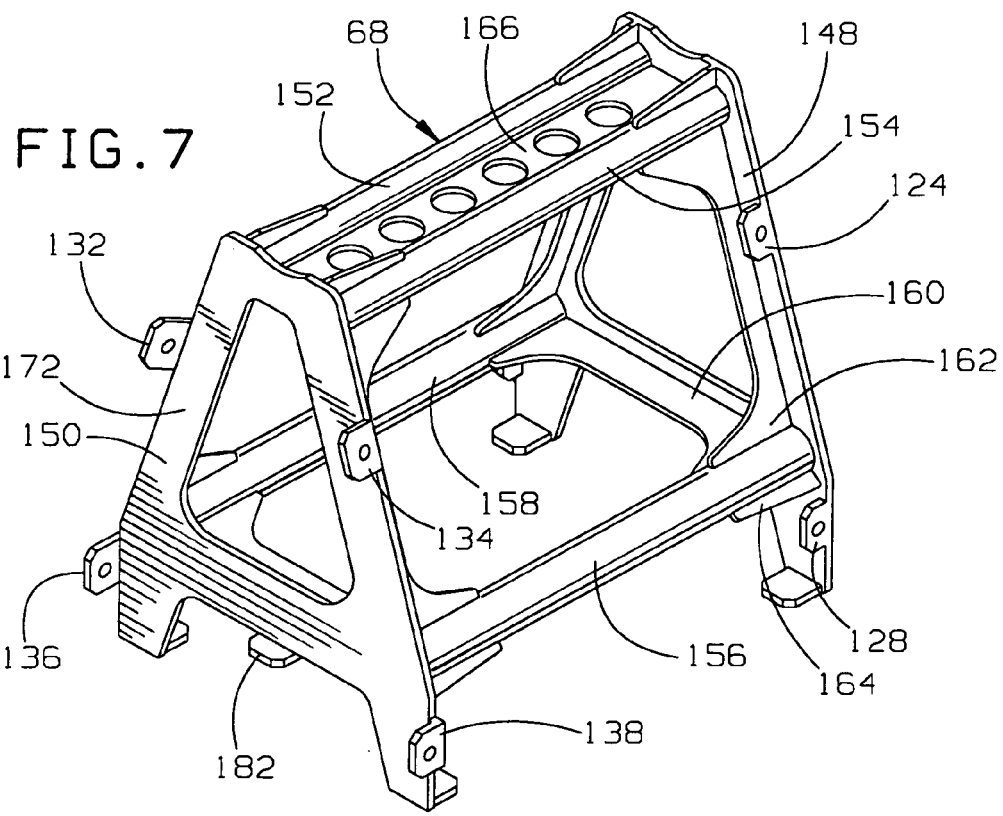
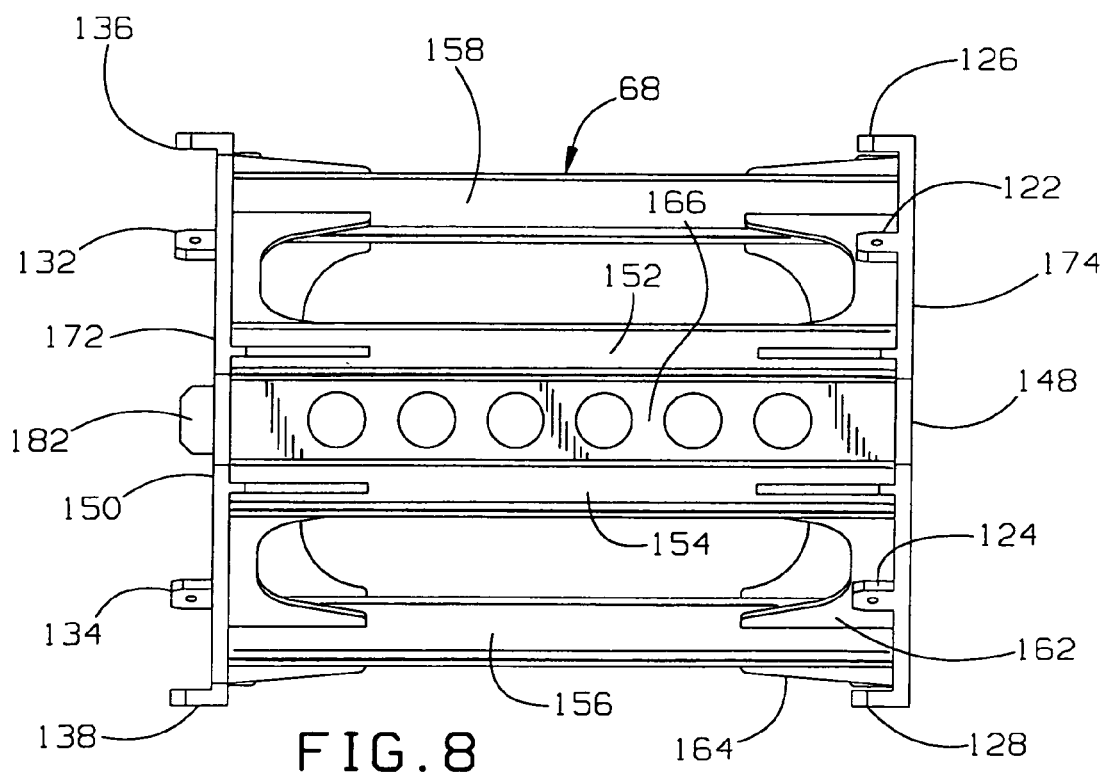

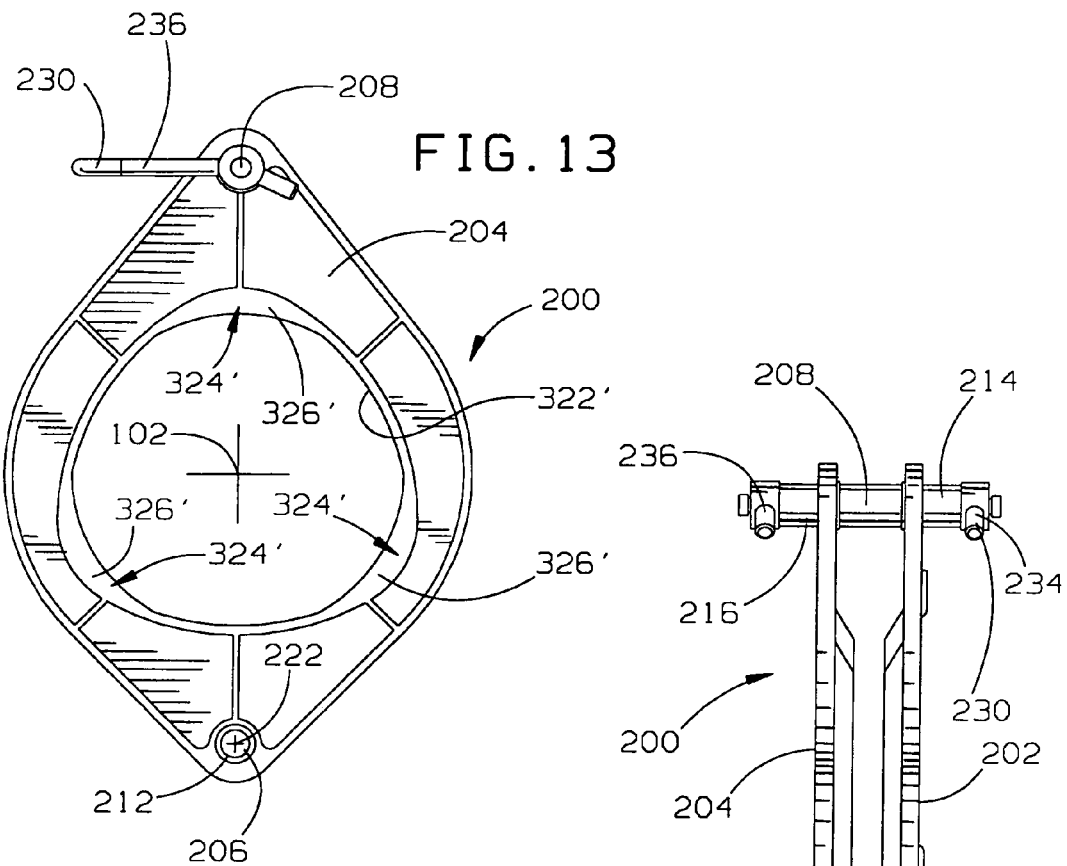
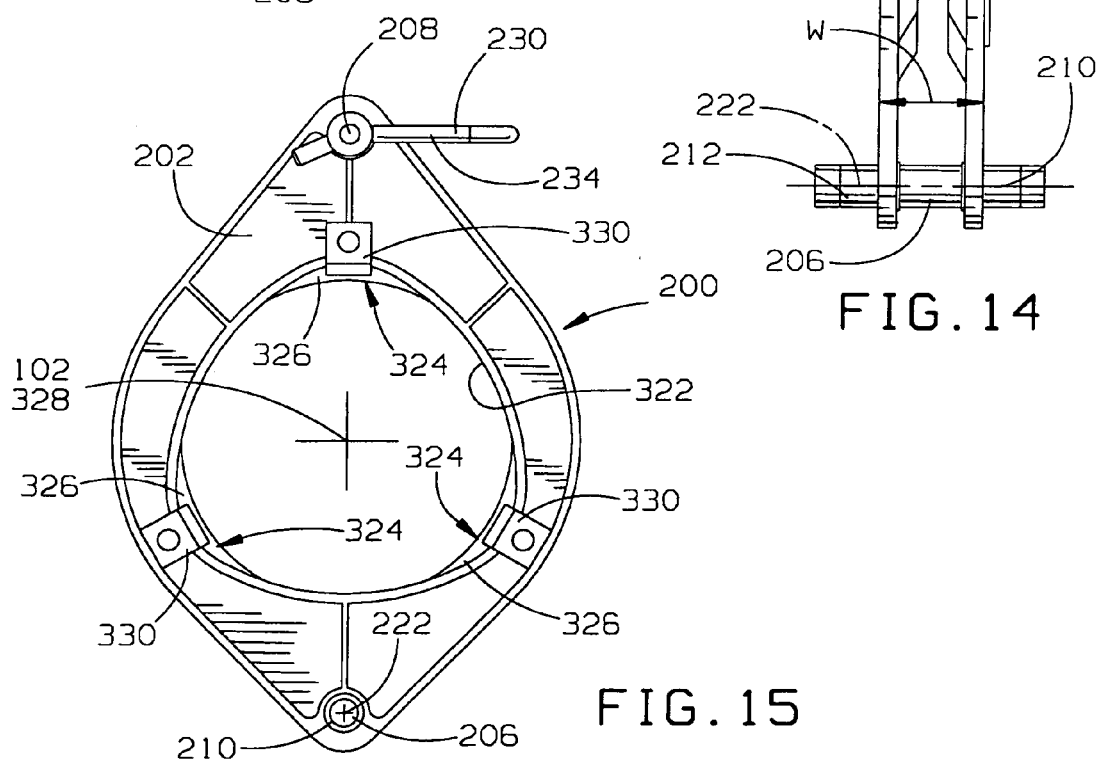
FIG. 13
FIG. 14
FIG. 15

METHOD AND APPARATUS FOR DRAWING A MOLE THROUGH A COMPOSITION

BACKGROUND OF THE INVENTION

1. Field of the Invention

This invention relates to cable pulling systems and, more particularly, to a system for drawing a mole through a composition to create a passageway between first and second spaced locations.

2. Background Art

It is well known in the industry to draw a mole through a composition to define a passageway through the composition between first and second spaced locations. It is known to use this method to replace collapsed conduits, such as those used for sewage, or for other applications. To carry out this process, access space is required at each of the first and second locations. A cable is directed from the second location through the existing conduit back to the first location at which the cable end is connected to an appropriately configured mole. The mole is engaged with a length of a replacement conduit in such a manner that the conduit will follow translatory movement of the mole. At the second location, a cable pulley mechanism is employed. The cable pulley mechanism, which is commonly hydraulically actuated, is braced against the composition and operated to draw the mole through the composition from the first location to the second location. The operator, who is situated at the second location, must monitor the advancement of the mole and disable the cable pulling mechanism at the appropriate time to prevent the mole from detrimentally contacting any part of the cable pulling mechanism and/or its support structure.

One known cable pulling mechanism is disclosed in U.S. Pat. No. 6,305,880. In that mechanism, the mole is advanced, through repeated pulling strokes, over its entire travel path between the first and second locations. In a typical pulling cycle, the mole will be advanced on the order of four inches. Each successive cycle must be initiated by an operator. While this system has been commercially successful, it has a number of inherent drawbacks.

First of all, as a result of the stepwise application of the pulling force, the mole, and following conduit, come to rest each time the mechanism is at the dwell stage for a pulling cycle. As this occurs, the stationary mole and conduit may become temporarily lodged before the pulling force can be reapplied thereto. To reinitiate movement of the mole, a greater force may be required than would be if the mole movement were not interrupted. This places greater demands on the cable pulling structure, the cable, the mole, the conduit, and the structure operatively connecting the mole to the cable and conduit. As a result, there is the potential for premature failure of one or more of these components and a potential reduction in the anticipated life of the overall system.

To address this problem, the system components may be made with increased capacity to ensure reliable operation and an adequately long life for the equipment. This may significantly increase the overall system costs which may have to be passed on to the system purchaser.

Another problem with the above prior art system is that the cable pulling mechanism is required to have potentially a large number of components to coordinatingly interact to alternatingly apply and release the pulling force on the cable. Generally, the more complicated systems become, the more prone they are to malfunction. Further, complicated systems are inherently more expensive than their simpler counterparts.

Still further, the above system has the drawback that the process for moving the mole between the first and second locations may be time consuming by reason of the stepwise advancement of the mole. These types of systems are generally designed to advance a mole through relatively dense compositions that offer a high resistance to movement of the mole. In some environments, such as in loose soil, a significantly lesser resistance to mole movement may be encountered. However, the system operator is nonetheless required to operate the system in the same manner, initiating each advancing cycle, so that the mole moves at a relatively slow rate from the first location to the second location. Since these systems may require two or more individuals to set them up and monitor their operation, the number of man hours required to complete a job may be significant.

Designers of this type of system strive to devise systems that can be economically manufactured, will reliably perform in potentially severe environments, can be conveniently and efficiently set up, operated, and broken down, and will perform reliably for an adequate lifetime. In the interest of economy, it is also a goal for designers of these systems to avoid the unnecessary expenditure of man hours for their operation.

SUMMARY OF THE INVENTION

In one form, the invention is directed to a method of advancing a mole to define a passageway through a composition between first and second locations spaced from each other a substantial first distance. The method includes the steps of: attaching the mole to a cable; providing a support; providing a cable pulling assembly on the support; and operating the cable pulling assembly to cause a pulling force on the cable to be continuously applied through the cable pulling assembly to the cable and therethrough to the mole to thereby cause the mole to be advanced in a path a substantial second distance, at least partially over the first distance between the first and second locations.

The step of operating the cable pulling assembly may involve operating the cable pulling assembly to cause the pulling force on the cable to be continuously applied as the mole is advanced over the entire first distance between the first and second locations.

The step of providing a cable pulling assembly may involve providing a cable pulling assembly having a drive, a gear assembly, and a capstan assembly. The drive is operable to operate the gear assembly to cause at least a part of the capstan assembly to be driven around a first axis so as to cause the cable to be engaged and pulled by the part of the capstan assembly as the part of the capstan assembly is driven around the first axis.

The step of providing a gear assembly may involve providing a gear assembly having a sun gear that is driven by the drive and at least one planet gear that is drivingly engaged between the sun gear and the part of the capstan assembly.

The step of providing a support may involve providing a support that acts between the composition and the cable pulling assembly and that transfers to the composition a reaction force generated by the cable pulling assembly as the cable pulling assembly is operated.

The step of providing a support may involve providing a support having a reaction plate with an enlarged, substantially flat surface, that is borne against the composition at the second location.

The step of providing a support may involve providing a support having a frame to which the cable pulling assembly is releasably attached and a reaction cage acting between the frame and the reaction plate.

The method may further include the step of releasably attaching the cable pulling assembly to the support in an operative position by relatively repositioning the cable pulling assembly and support without requiring use of any separate fasteners to maintain the cable pulling assembly attached to the support in the operative position.

The method may further include the step of causing operation of the cable pulling assembly to be automatically stopped as an incident of the mole being advanced to a predetermined position relative to the cable pulling assembly.

The method may further include the step of causing a conduit to follow movement of the mole from the first location to the second location whereby a continuous passageway is defined by the conduit between the first and second locations.

In one form, the step of providing a cable pulling assembly involves providing a cable pulling assembly having a capstan assembly with an annular cable-engaging part and a drive that is operable to move the cable-engaging part around a first axis so that the cable is engaged by the cable-engaging part and pulled as the cable-engaging part is moved around the first axis.

The method may further include the step of locally exerting a radial force on the cable as the drive is operated to urge the cable toward the cable-engaging part of the capstan assembly.

The method may further include the step of bearing the cable against the cable-engaging part of the capstan assembly through in excess of 180° around the first axis.

The step of bearing the cable against the cable-engaging part of the capstan assembly may involve bearing the cable against the cable-engaging part of the capstan assembly through on the order of 270° around the first axis.

The invention is also directed to an apparatus for defining a passageway through a composition between first and second spaced locations. The apparatus has a cable pulling assembly and a support for the cable pulling assembly. The cable pulling assembly is operable by a drive that is in turn operable to cause a pulling force on a cable to be continuously applied so that a mole attached to the cable can be moved under a force continuously applied to the cable through a composition between first and second spaced locations.

The apparatus may be provided in combination with a cable and a mole attached to the cable.

In one form, the cable pulling assembly has a capstan assembly with an annular cable-engaging part and a gear assembly operatively engaged between the drive and the cable-engaging part to cause the cable-engaging part to be driven around a first axis.

In one form, the gear assembly has a sun gear that is driven by the drive around the first axis and at least one planet gear that is drivingly engaged between the sun gear and the cable-engaging part of the capstan assembly.

The gear assembly may include a plurality of planet gears, each drivingly engaged between the sun gear and the cable-engaging part of the capstan assembly.

In one form, the support has a reaction plate with an enlarged, substantially flat surface that can be borne against a composition to transfer a reaction force generated by the cable pulling assembly to a composition, through which a passageway is being formed, as the cable pulling assembly is operated.

In one form, the support further has a frame to which the cable pulling assembly is attached and a reaction cage acting between the frame and the reaction plate.

The cable pulling assembly may be releasably attached to the frame in an operative position.

In one form, the cable pulling assembly is releasably attached to the frame by relatively repositioning the cable pulling assembly and frame so that the cable pulling assembly can be changed from a position fully separated from the frame into the operative position and maintained in the operative position without requiring any separate fasteners.

In one form, there are a cooperating projection and receptacle, one each on the cable pulling assembly and frame, with the projection defining a pivot axis, and the cable pulling assembly is changeable from a pre-assembly position into the operative position by pivoting movement of the cable pulling assembly around the pivot axis.

In one form, the receptacle is U-shaped and opens upwardly.

A graspable handle may be provided on the cable pulling assembly and can be grasped and repositioned to facilitate repositioning of the cable pulling assembly relative to the frame.

In one form, the cable pulling assembly has a bearing element spaced from the pivot axis. With the cable pulling assembly in the operative position, the bearing element abuts to the support to transfer a reaction force generated by the cable pulling assembly to the support as the cable pulling assembly is operated.

In one form, the projection is on the cable pulling assembly and abuts to the support simultaneously as the bearing element abuts to the support with the cable pulling assembly in the operative position so that the bearing element and projection cooperatively transfer the reaction force generated by the cable pulling assembly to the support as the cable pulling assembly is operated.

The support may have a U-shaped receptacle bounded by an edge to which the bearing element abuts.

In one form, the cable pulling assembly has a capstan assembly with an annular cable-engaging part that is driven around the first axis to cause a pulling force to be exerted by the cable-engaging part on a cable.

In one form, the cable pulling assembly is repositionable relative to the support. A cable tensioning assembly may be provided on the support for locally exerting a radial force on the cable engaged by the cable-engaging portion.

The apparatus may further include a conduit with an internal passageway and that is engaged by the mole to follow movement of the mole as the mole is moved through the cable pulling assembly.

In one form, the reaction cage is releasably connected to each of the reaction plate and the frame.

In one form, the drive is hydraulically operated.

The apparatus may further include a switch assembly which causes the drive to be disabled automatically as an incident of a mole being advanced to a predetermined position relative to the cable pulling assembly.

The apparatus may further be provided in combination with a cable that bears against the cable-engaging part through at least 180° around the first axis.

In one form, the cable bears against the cable-engaging part through on the order of 270° around the first axis.

BRIEF DESCRIPTION OF THE DRAWINGS

FIG. 3 is a perspective view of the inventive apparatus in FIG. 1 and including a cable pulling assembly and a support therefor, with the support including a frame, to which the cable pulling assembly is releasably attached, a reaction plate, and a reaction cage between the frame and reaction plate;

FIG. 4 is a side elevation view of the apparatus in FIG. 3;

FIG. 7 is a perspective view of the reaction cage on the apparatus in FIGS. 3–5;

FIG. 8 is a plan view of the reaction cage in FIG. 7;

FIG. 13 is an enlarged, side elevation view of a traction support assembly that is part of the cable pulling assembly in FIGS. 3–5;

FIG. 14 is a rear elevation view of the traction support assembly in FIG. 13;

FIG. 15 is an elevation view of the traction support assembly in FIGS. 13 and 14, from the side opposite that in FIG. 13;

DETAILED DESCRIPTION OF THE DRAWINGS

Figure 1:
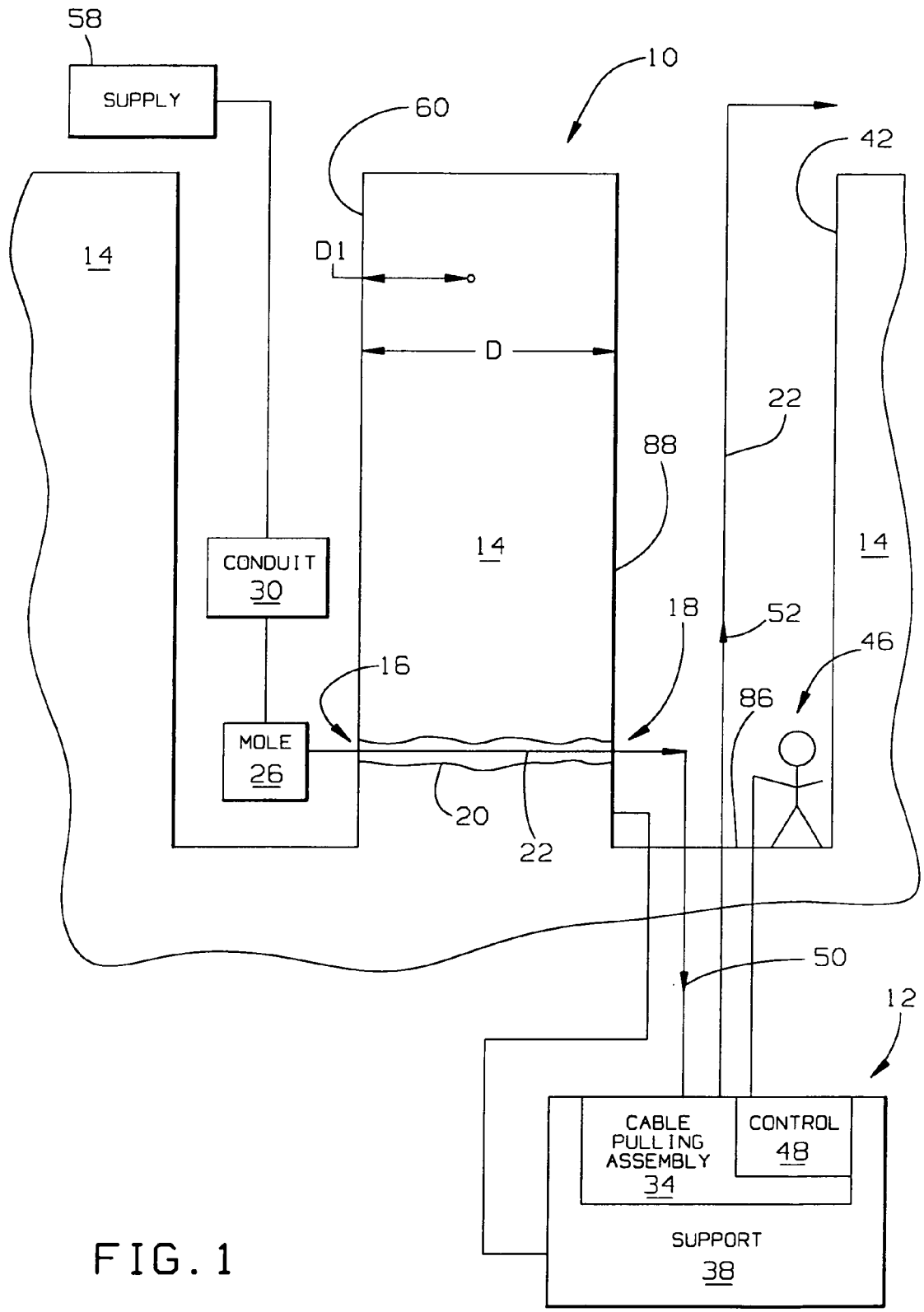
FIG. 1 is a schematic representation of an exemplary environment for practicing the present invention and showing, in schematic form, an apparatus, according to the present invention, for defining a passageway through a composition between first and second spaced locations.
Figure 2:
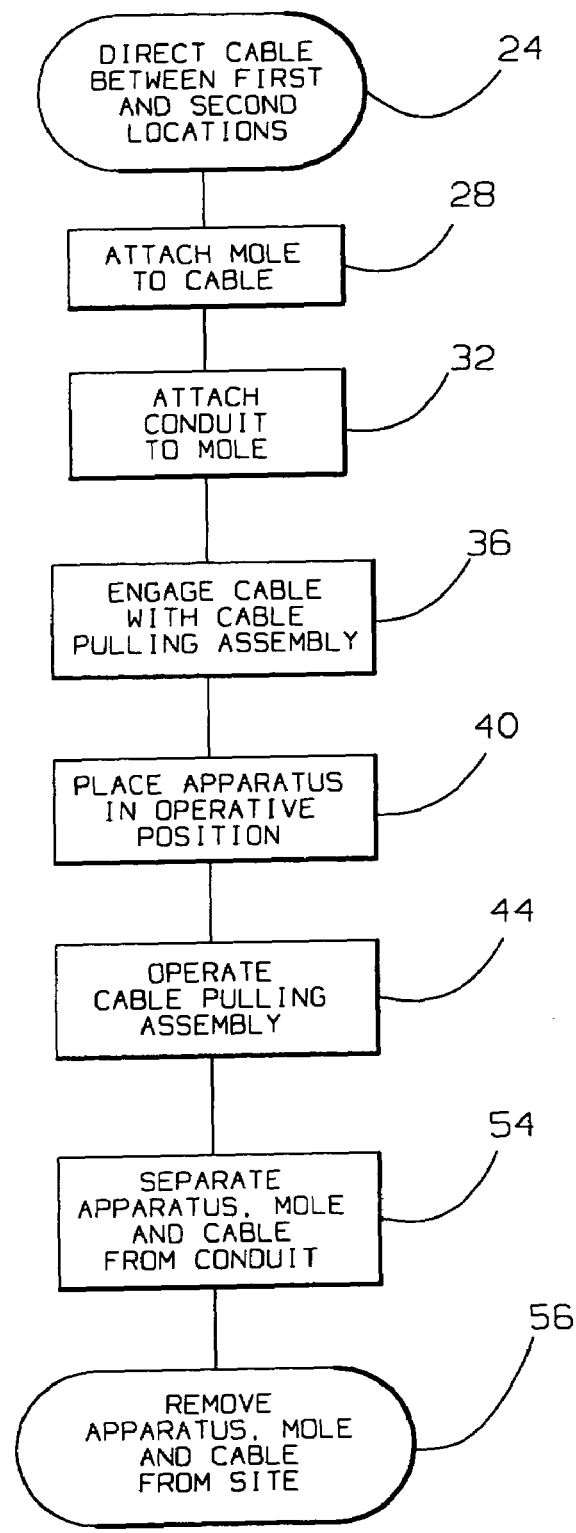
FIG. 2 is a flow diagram showing the steps of advancing a mole to define a passageway through a composition between first and second locations, according to the present invention.

In FIG. 1, a representative environment is shown at 10 for the practice of the present invention. An apparatus, according to the invention, is shown at 12 for defining a passageway through a composition at 14 between a first location 16 and a second location 18. The composition 14 may be any naturally occurring composition, a composition that is formed, as through construction, or the like, or a combination thereof. In this particular application, a collapsed conduit 20, extending between the first and second locations 16, 18 is being replaced. The process for operating the inventive apparatus 12 will now be described with reference additionally to the flow diagram shown in FIG. 2.

Initially, a cable 22 is directed between the first and second locations 16, 18 as shown at block 24. To accomplish this, the cable 22 can be directed from either the first location 16 to the second location 18, or alternatively, from the second location 18 to the first location 16. If the condition of the conduit 20 permits, the cable 22 may be directed therethrough without resistance. Alternatively, conventional means, known to those skilled in the art, may be utilized to direct the cable 22 between the first and second locations 16,18. The invention also contemplates that the cable 22 could be directed between the first and second locations 16,18 without any preformed passageway, as defined by the conduit 20, as by preforming a small passageway therefor, or by forcibly advancing the cable 22 through the composition between the first and second locations 16, 18. Again, those skilled in the art are familiar with conventional means that can be utilized to direct the cable 22 through the composition 14 between the first and second locations 16,18, without any preexisting passageway.

At the first location 16, a mole 26 is attached to the cable 22, as shown at block 28. In the event that the cable 22 is directed from the first location 16 towards the second location 18, the mole 26 can be pre-attached to the cable 22. Those skilled in the art are well versed in the selection of a mole to penetrate the specific composition 14 and generate an opening of the desired dimensions therethrough.

A conduit 30 is attached to the mole 26, as shown at block 32. An end of the conduit 30 is attached to the mole 26 to follow movement thereof as the cable 22 draws the mole 26 from the first location 16 to the second location 18. Suitable connecting structures are also well known to those skilled in this art.

The cable 22 is then engaged with a cable pulling assembly 34, as shown at block 36. The cable pulling assembly 34 is carried on a support 38. The cable pulling assembly 34 may be permanently mounted to the support 38, but is more preferably separably mounted thereto, as explained in greater detail below. The support 38 bears against the composition 14 to transfer to the composition 14 a reaction force that is generated as the cable pulling assembly 34 draws the cable 22 between the first location 16 and the second location 18. It should be understood that while the support 38 is described throughout as bearing against the composition 14, it is also contemplated that the support 38 could bear against any other firm structure that may be integrated into the composition 14, or separate therefrom. The description of the support 38 as bearing against "the composition 14" hereinbelow is intended to encompass bearing against any firm structure.

The apparatus 12 is placed in an operative position at the first location 18, as shown at block 40. The apparatus 12 can be pre-assembled and directed downwardly in that state through an opening 42 to adjacent the second location 18, or directed through the opening 42 in parts and assembled at the second location 18, as hereinafter described.

As shown at block 44, the cable pulling assembly 34 is operated by a user/operator 46 through a control 48 to exert a pulling force on the cable 22, as indicated by the arrow 50. The pulled cable 22 is then directed away from the cable pulling assembly 34, as indicated by the arrow 52, and may be accumulated at the second location 18, or directed outwardly through the opening 42.

The cable pulling assembly 34 may be continuously operated to cause a pulling force on the cable 22 to be continuously applied through the cable pulling assembly 34 to the cable 22 and therethrough to the mole 26 to thereby cause the mole 26 to be advanced in a travel path equal to the entire distance D between the first and second locations 16,18, or at least a substantial distance D1 that is less than the distance D. The distance D may be, for example, several feet up to potentially a hundred or more feet. It is contemplated that the mole 26 be moved under a continuously applied force through at least the substantially shorter distance D1, that is less than the distance D, but on the order of one foot or more.

Once the conduit 30 is drawn in a manner that a sufficient length thereof is exposed at the first and second locations 16,18, the apparatus 12, mole 26, and cable 22 are separated from the conduit 30, as shown at block 54. The apparatus 12, mole 26, and cable 22 can then be removed from the site, as shown at block 56. The apparatus 12 can be removed as a unit or broken down to facilitate removal and transportation in parts.

In the depicted environment 10, the first and second locations 16,18 are shown underground. In this case, the conduit 30 can be drawn from a supply 58 thereof, above ground, to be advanced in following relationship with the mole 26, between the first and second locations 16,18. In this environment 10, the operator/user 46 is likewise located underground. A vertical opening 60 can be formed to a sufficient diameter to allow the conduit 30 to be drawn from the supply 58 to be presented at the first location 16, and drawn through the composition 14 from the first location 16 to the second location 18, without damage thereto.

It should be understood that the invention is not limited to an underground application and can be used in any environment in which a mole, or other like leading structure, is to be drawn by a cable through a composition, with or without a partial or full passage opening. Further, it is not required that a conduit be drawn through the composition, as solid cable or other material could be connected to follow the movement of the mole, or the like, in the same manner, to extend the same between corresponding first and second locations.

Further, in the event that a conduit is advanced between the first and second locations, the nature of the conduit is not in any way limited. The conduit could be used to define a receptacle for cables, such as in the telecommunications industry, to communicate water, that may be fresh water or sewage, etc.

Figure 5:
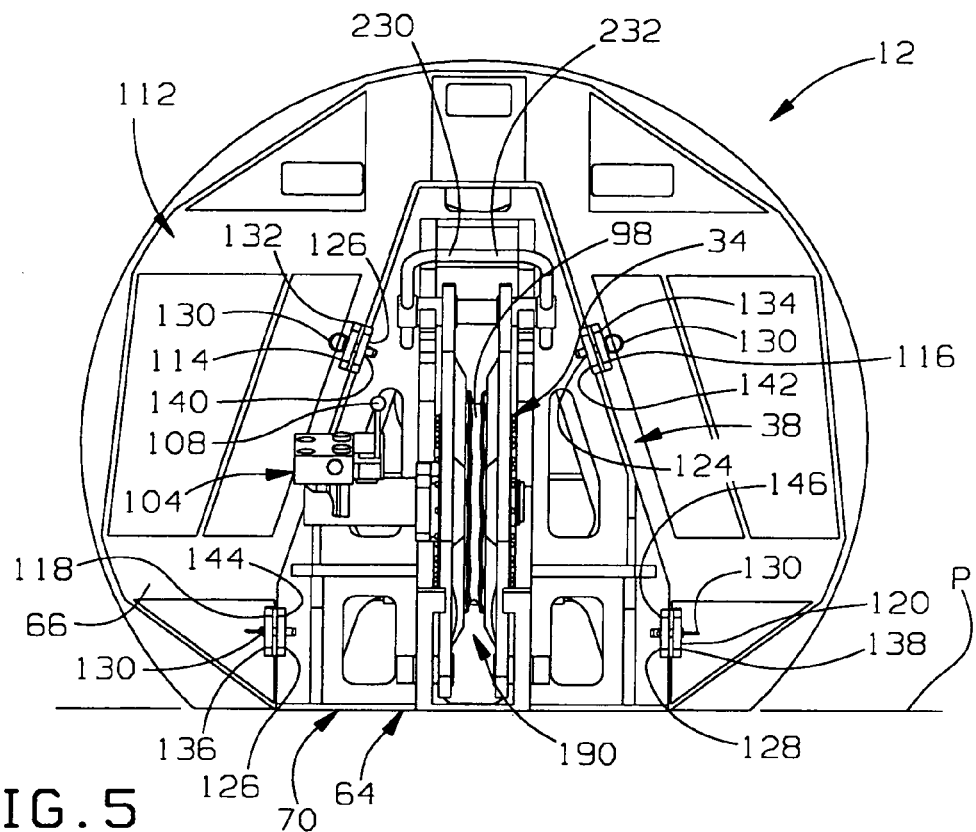
FIG. 5 is a rear elevation view of the apparatus in FIGS. 3 and 4.

Referring now to FIGS. 3–5, one specific form of the inventive apparatus 12 is shown. The apparatus 12 consists of the cable pulling assembly 34, which is mounted in an operative position on the support 38. The support 38 consists of a frame 64 to which the cable pulling assembly 34 is releasably, operatively connected, a reaction plate 66, and a reaction cage 68 acting between the frame 64 and reaction plate 66. With the frame 64, reaction cage 88, reaction plate 66, and reaction cage 68 assembled, a downwardly facing support surface at 70 is defined by coplanar surfaces on the frame 64, reaction cage 88, and reaction plate 66. The frame 64 has a flat surface 72, with the reaction plate 66 having flat surfaces 74,76 defined on horizontally projecting feet 78, 80, respectively, and flat surfaces 82 (one shown in FIG. 4) on horizontally projecting feet 83 (one shown in FIG. 4). A reference plane P, coincident with the surfaces 72, 74, 76, 82, is orthogonal to a plane P1 that coincides with an enlarged, substantially flat surface 84 on the reaction plate 66. With this configuration, the surfaces 72, 74, 76, 82 can be placed against an upwardly facing surface 86, as shown in FIG. 1. With the apparatus 12 supported in this manner, the reaction plate surface 84 can be braced against a vertically extending surface 88 on the composition 14 at the second location 18.

The reaction plate 66 has an opening 90 through which the cable 22 can be drawn by the cable pulling assembly 34. As the cable 22 is drawn by the cable pulling assembly 34 in the direction of the arrow 92 in FIG. 4, a reaction force is generated which is transferred from the cable pulling assembly 34 through the frame 64, reaction cage 58 and reaction plate 66 to the composition 14 which, as previously discussed, may be an existing component or any other preexisting or added structure that is stable and sufficiently rigid to withstand the reaction force generated during operation of the cable pulling assembly 34.

As depicted in FIG. 4, the cable 22 is drawn generally in the path indicated by the dotted line at 94. The cable 22 moves through the opening 90 in the reaction plate 66, through the reaction cage 68, and a vertically extending wall 96 on the frame 64, to engage an annular cable-engaging part 98 (FIG. 5) at approximately the 12 o'clock position thereon. The cable 22 wraps in a clockwise direction in FIG. 4 around the cable-engaging part 98 and departs from the cable-engaging part 98 at approximately the 9 o'clock position thereon to be directed upwardly for appropriate accumulation as the cable pulling assembly 34 is operated. As explained in greater detail below, the cable-engaging part 98 is driven about an axis 102 to cause continuous advancement of the cable 22 in the aforementioned path, shown by the dotted line 94 in FIG. 4.

A drive/hydraulic motor assembly at 104, in communication with a pressurized hydraulic fluid supply 106, is operable to drive the cable-engaging part 98 around the axis 102, as is also described in greater detail below. According to the invention, the drive/hydraulic motor assembly 104 can be continuously operated to cause the cable-engaging part 98 to continuously exert a pulling force on the cable 22 and therethrough to the mole 26 to cause the mole 26 to be advanced. The mole 26 is thus capable of being advanced a substantial distance under this constant pulling force. A "substantial distance", as used herein, is intended to be on the order of a foot or more.

More preferably, the entire distance to be traversed by the mole 26 through the composition 14 is travelled under a continuous force application through the cable 22 to the mole 26. This obviates the incorporation of a conventional-type mechanism typically operated by applying and releasing a pulling force on the cable 22. An actuator 108, associated with the control 48, is manually operable by the user/operator to control the drive/hydraulic motor assembly 104. Thus, the user/operator has the ability to cause the pulling force to be applied on the cable 22 through the cable pulling assembly 34 continuously, or at desired intervals, to cause the mole 26 to be advanced a substantial distance under a constant pulling force. The drive/hydraulic motor assembly 104 can be continuously operated as the mole 26 moves fully from the first location 16 to the second location 18.

A switch assembly 110 is provided to disable the drive/hydraulic motor assembly 104 and thereby stop operation of the cable pulling assembly 34 with the mole 26 advanced to a predetermined position relative to the cable pulling assembly 34. Accordingly, the advancement of the cable 22 and the mole 26 will be automatically stopped so that no operator intervention is required to avoid drawing of the mole 26 against any part of the support 38 or cable pulling assembly 34 as might inflict damage thereon.

The apparatus 12 preferably has a modular construction which allows it to be transported in separate pieces and assembled on site. In this embodiment, the cable pulling assembly 34, frame 64, reaction cage 68, and reaction plate 66 are formed as separable components.

Figure 6:
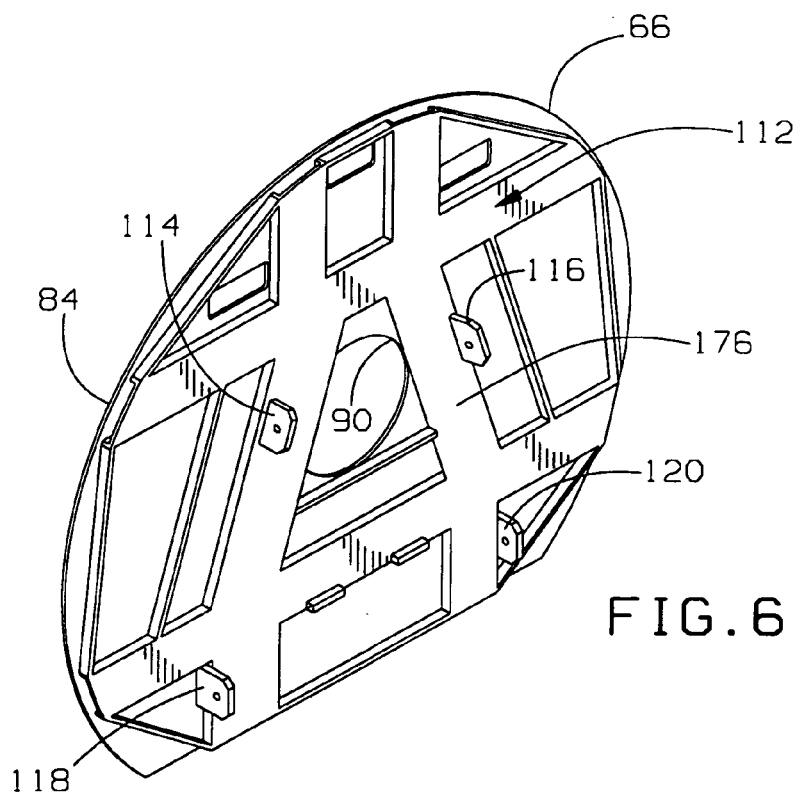
FIG. 6 is a perspective view of the reaction plate on the apparatus of FIG. 3–5.
Figure 9:
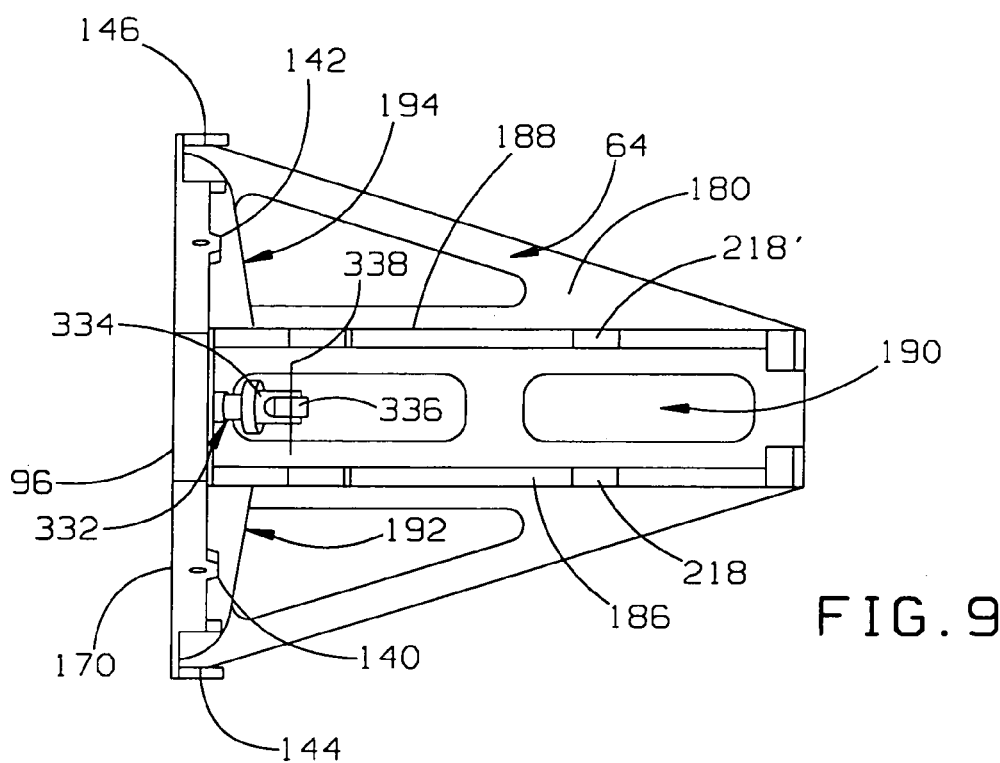
FIG. 9 is a plan view of the frame on the apparatus of FIGS. 3–5.
Figure 10:
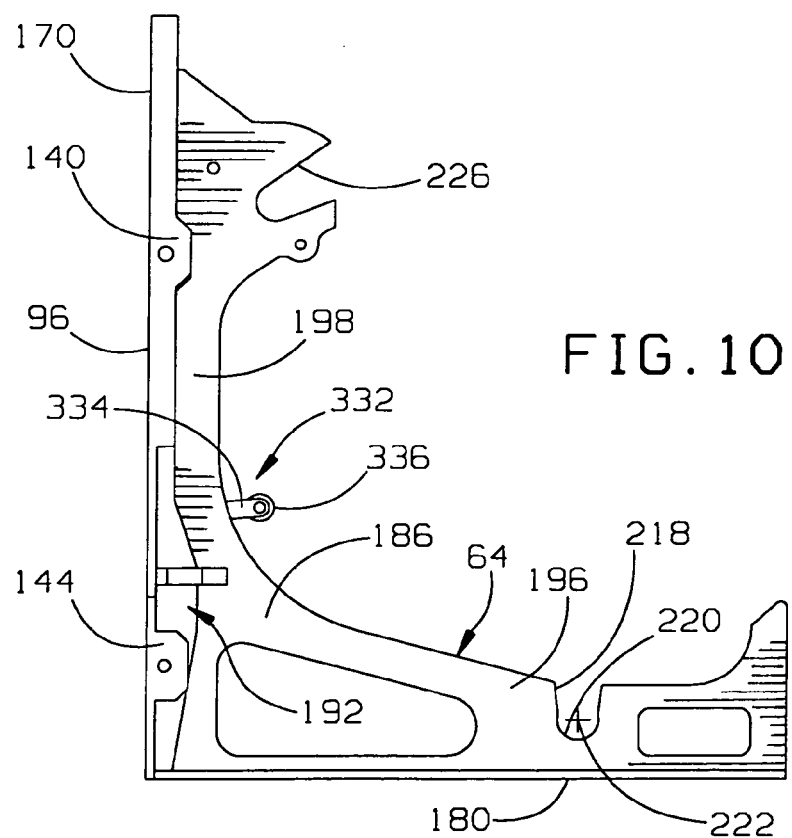
FIG. 10 is a side elevation view of the frame in FIG. 9.
Figure 11:
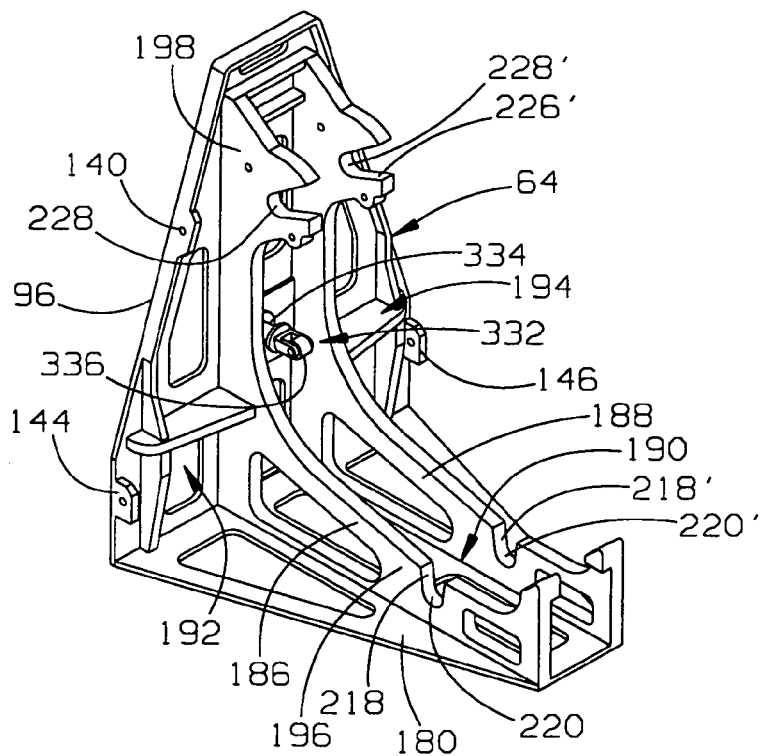
FIG. 11 is a perspective view of the frame in FIGS. 9 and 10.
Figure 12:
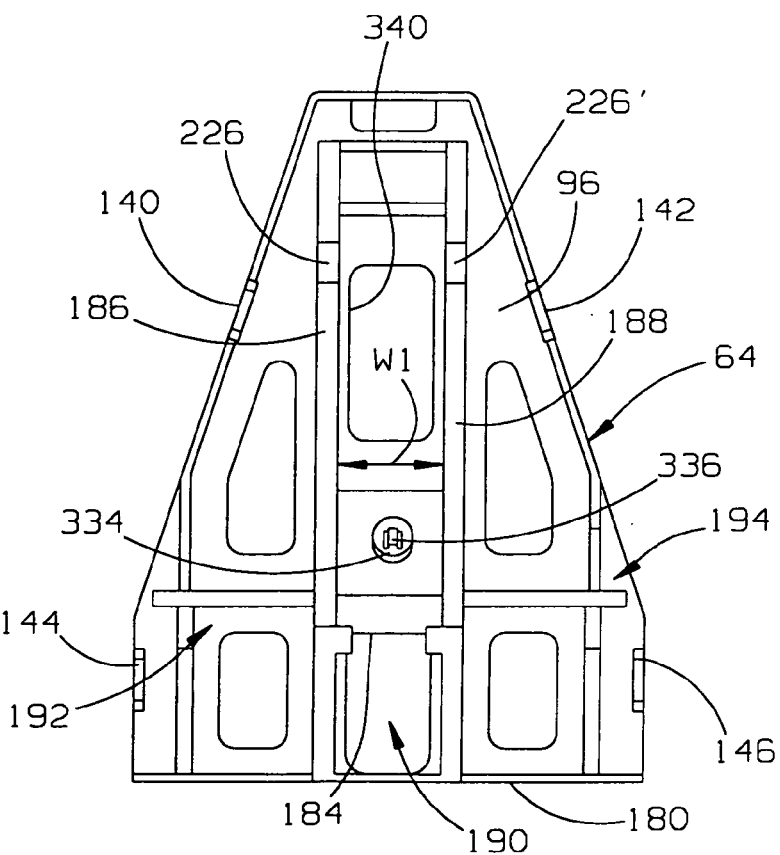
FIG. 12 is a rear elevation view of the frame in FIGS. 9–11.

As seen additionally in FIGS. 6–8, the reaction plate 66 has a reinforced wall 112 through which the cable opening 90 is formed. The flat surface 84 is defined on one side of the wall 112. Mounting tabs 114,116,118,120 project from the side of the wall 112 opposite that on which the surface 84 is defined. With the reaction plate 66 and reaction cage 68 in the assembled relationship shown in FIGS. 3–5, mounting tabs 122,124,126,128 on the reaction cage situate adjacent to the mounting tabs 114,116,118,120, respectively, to allow releasable locking pins 130 to be directed through bores in each of the adjacent, paired mounting tabs 114,122; 116,124; 118,126; and 120,128. The locking pins 130 substantially fix the reaction plate 66 and reaction cage 68 against relative fore and aft movement, along a line extending between left and right in FIG. 4.

As seen by reference additionally to FIGS. 9–12, the frame 64 and reaction cage 68 are releasably connectable in an operative state through a like cooperative arrangement of mounting tabs 132,134,136,138 on the reaction cage 68 and 140,142,144,146 on the frame 64. Locking pins 130 extend through the paired mounting tabs 132,140; 134,142; 136, 144; and 138,146 to substantially fix the frame 64 and reaction cage 68 against relative fore and aft movement.

The reaction cage 68 has spaced walls 148,150, each generally in the shape of the letter "A". The wall 148 carries the mounting tabs 122,124,126,128, with the wall 150 carrying the mounting tabs 132,134,136,138. Tubular reinforcing elements 152,154,156,158 connect between the walls 148,150 to unitize the reaction cage 68. The connection of each of the tubular reinforcing elements 152,154, 156,158 to its respective wall 148,150 is reinforced by gussets 160,162,164, as shown for the exemplary connection between the tubular reinforcing element 156 and the wall 148. A reinforcing web 166 connects between the tubular reinforcing elements 152,154 and the walls 148,150.

Through this arrangement, the reaction force generated during operation of the cable pulling assembly 34 is transmitted from the frame 64 to the wall 150 and from there through the tubular elements 152,154,156,158 to the wall 148 and to the reaction plate 66, which distributes the force over the area to which the flat surface 84 on the reaction plate 66 abuts.

The frame wall 96 has a flat surface 170, matched generally in shape to the "A" shape of the wall 150 on the reaction cage 68, so as to transmit the reaction force over the area of the flat surface 170 on the wall 168 to an abutting flat surface 172 on the wall 150 over a substantial area. The wall 148 has a corresponding flat surface 174 which facially abuts to a flat surface 176 (FIGS. 4, 6) on the reaction plate 66, to distribute the reaction force over a substantial area of the reaction plate 66.

As seen in FIG. 4, the reaction cage 68 defines a working space at 178. Through the working space 178, the user/operator can manipulate the cable 22 and conduit 30 during setup and operation of the apparatus 12.

The frame 64 has a generally L-shaped construction defined by the vertically extending wall 96, and a horizontally extending wall 180. With the frame 64 and reaction 68 in assembled relationship, a tongue 182 on the reaction cage 68 situates beneath a downwardly facing edge 184 (FIG. 12) on the frame 64. The cooperation between the tongue 182 and edge 184 facilitates alignment of the frame 64 and reaction cage 68.

The frame walls 96,180 are reinforced by a pair of spaced, L-shaped mounting braces 186,188 which define a mounting space 190 therebetween for the cable pulling assembly 34. Reinforcing gusseting 192, for the exemplary mounting brace 186, rigidities the connection between the mounting brace 186 and walls 96,180. The mounting brace 188 is similarly reinforced through gusseting at 194.

The mounting braces 186,188 have the same construction. Exemplary mounting brace 186 has a horizontal leg 196 and a vertical leg 198 which are configured to cooperatively, releasably support a traction support assembly 200, which is shown in FIGS. 13–15, and which defines a foundation for the operating components of the cable pulling assembly 34. The traction support assembly 200 consists of traction support plates 202,204 that are joined, and maintained in spaced relationship, by a bottom pivot pin 206 and a separate bearing element/pin 208 adjacent the top of the traction support assembly 200.

The traction support plates 202,204 are joined so as to cooperatively produce a combined width W (FIG. 14). The pivot pin 206 has a length that is greater than the width dimension W so that it defines stub shaft portions 210,212 projecting to beyond the walls 202,204, respectively. The bearing pin 208 has a similar length to define stub shaft portions 214,216, respectively extending to beyond the traction support plates 202,204. The width W is slightly less than the width W1 (FIG. 12) of the mounting space 190 between the mounting braces 186,188 to allow a portion of the cable pulling assembly 34 to be directed therebetween, as explained in detail below.

Figure 16:
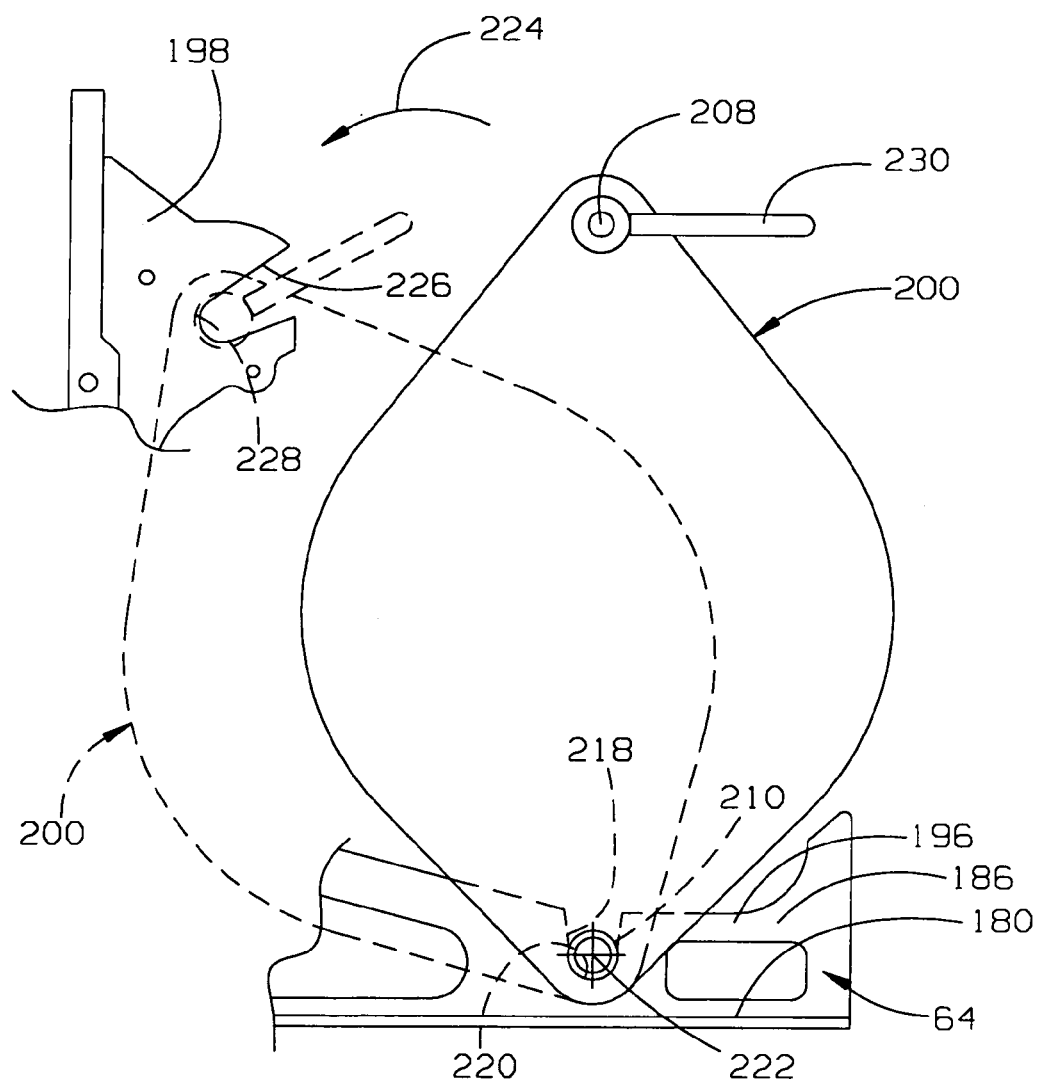
FIG. 16 is a fragmentary, schematic representation showing the relationship between the cable pulling assembly and frame on the apparatus in FIGS. 3–5 and with the cable pulling assembly shown in a preassembly position in solid lines and in an operative position in dotted lines.
Figure 17:
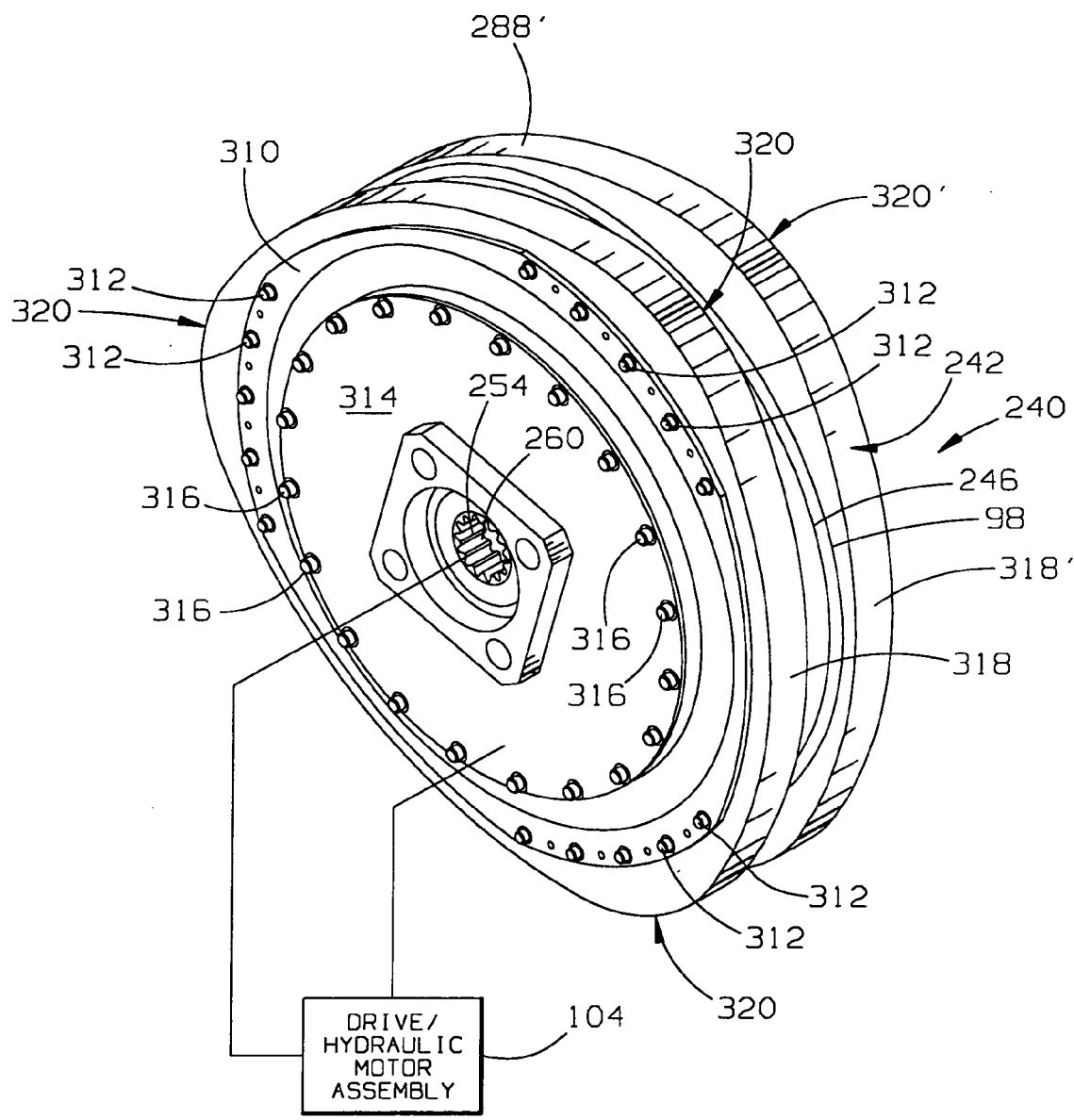
FIG. 17 is an enlarged, perspective view of an operating component package assembly that is part of the cable pulling assembly and attached to the traction support assembly in FIGS. 13–15.
Figure 18:
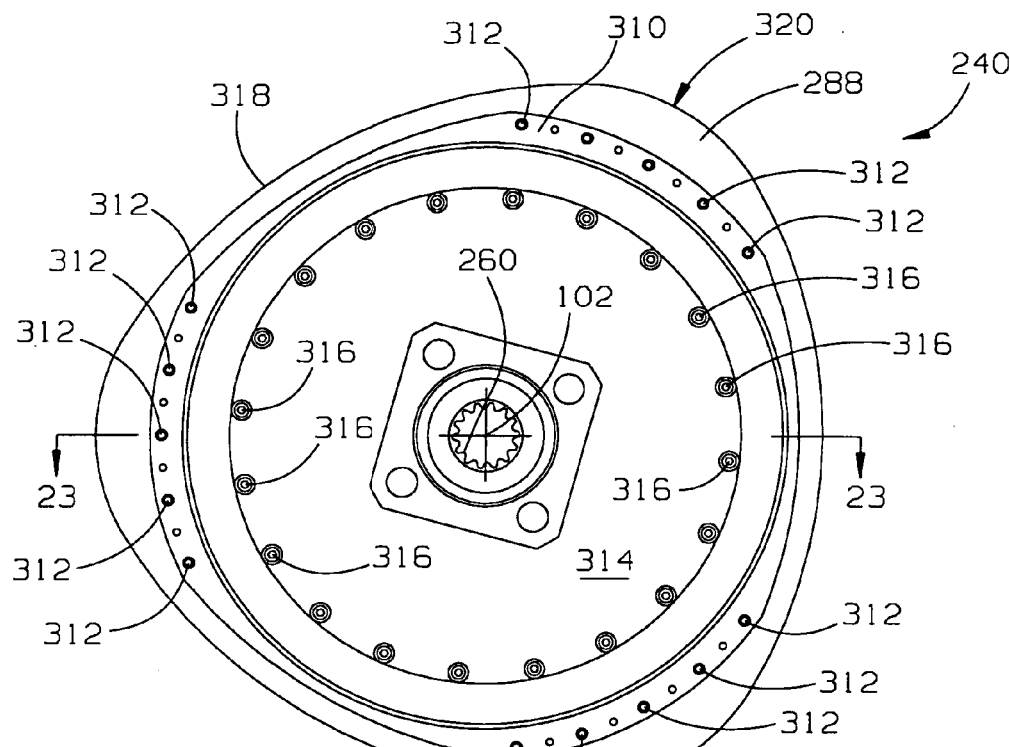
FIG. 18 is an enlarged, side elevation view of the operating component package assembly in FIG. 17.
Figure 19:
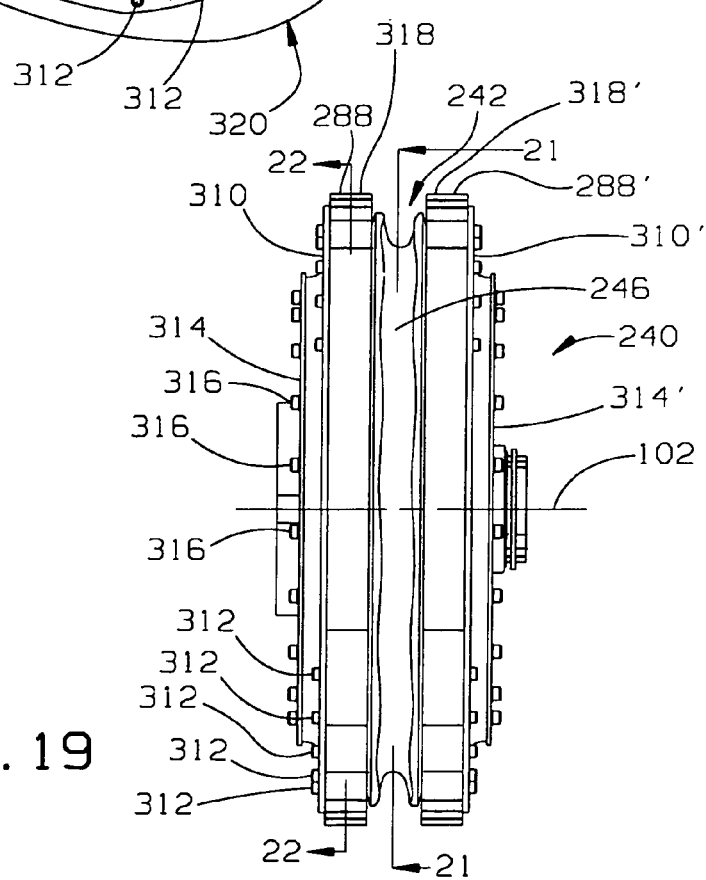
FIG. 19 is an enlarged, rear elevation view of the operating component package assembly in FIGS. 17 and 18.
Figure 20:
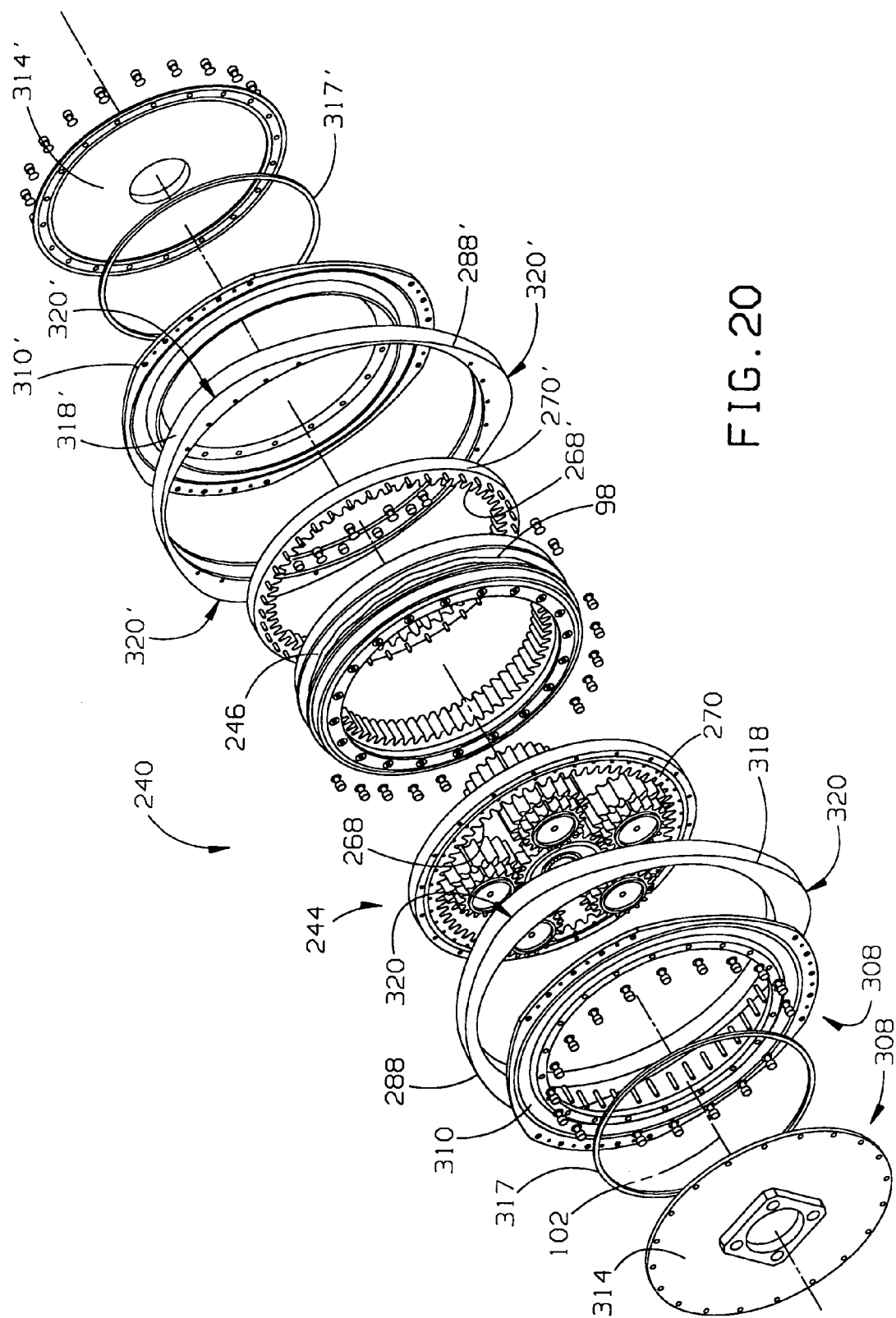
FIG. 20 is an exploded, perspective view of the operating component package assembly in FIGS. 17–19.
Figure 21:
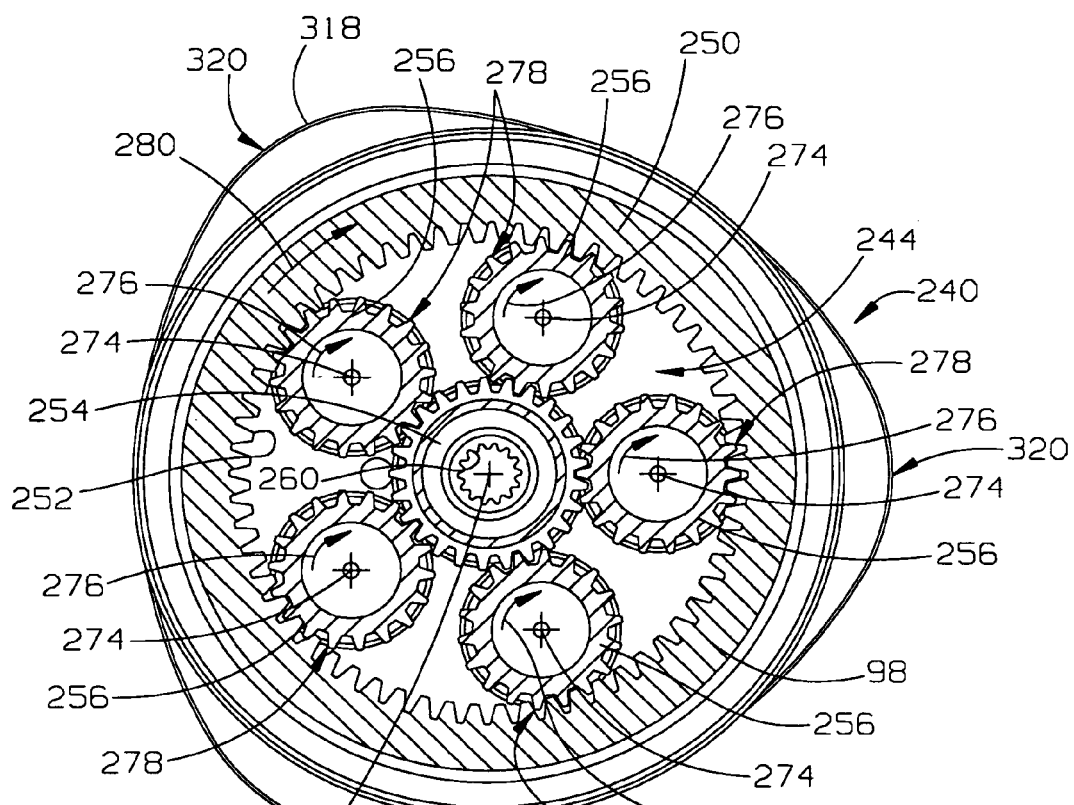
FIG. 21 is an enlarged, cross-sectional view of the operating component package assembly taken along line 21—21 of FIG. 19.

As seen additionally in FIG. 16, the mounting brace 186 has an upwardly opening, U-shaped receptacle 218, with the mounting brace 188 having a like, upwardly opening receptacle 218'. With the bottom portion of the traction support assembly 200 directed between the mounting braces 186, 188, the stub shafts 210,212 on the pivot pin 206 can be guided into the receptacles 218,218', respectively. The receptacles 218,218' have curved surfaces 220,220' which cooperate with the stub shafts 210,212 to guide pivoting movement of the pivot pin 206 around a horizontal axis 222 relative to the frame 64.

With the traction support assembly 200 initially separated from the frame 64, the traction support assembly 200 can be repositioned relative to the frame 64 to direct the stub shafts 210,212 downwardly into the receptacles 218,218' so that a preassembly position, as shown in solid lines in FIG. 16, is realized. The traction support assembly 200 is changed from the preassembly position into the operative position, shown in FIGS. 3–5 and in dotted lines in FIG. 16, by pivoting movement around the axis 222 in the direction of the arrow 224 in FIG. 16. As this occurs, the stub shaft portions 214,216 on the bearing pin 208 move into U-shaped receptacles 226,226' in the mounting braces 186,188, respectively. The bases of the receptacles 226,226' are defined by curved surfaces 228,228' which are complementary to the shape of the stub shaft portions 214, 216.

With the traction support assembly 200 in the operative position, a reaction force generated by operation of the cable pulling assembly 34 is caused to be simultaneously transmitted from the stub shafts 210,212 to the curved surfaces 220,220' bounding the receptacles 218, and from the stub shafts 214,216 on the bearing pin 208 to the surfaces 228,228' bounding the receptacles 226,226'. Through this arrangement, a reaction force generated during operation of the cable pulling assembly 34 is distributed to the frame wall 64, at vertically and horizontally spaced locations, and from there to the wall 150 of the reaction cage 68.

The cable pulling assembly 34 can be conveniently assembled to and separated from the frame 64 by practicing the steps described above. Accordingly, the cable pulling assembly can be placed in its operative position, and maintained in the operative position, under its own weight without the requirement of separate fasteners, by merely relatively repositioning the cable pulling assembly 34 and frame 64. Manipulation of the cable pulling assembly 34 is facilitated by the provision of a U-shaped handle 230 at the top of the traction support assembly 200. The handle 230 has a base 232 (FIGS. 3 and 5) and spaced legs 234,236 extending from the base 232. The legs 234,236 are connected, one each, to the stub shafts 214,216 on the bearing pin 208.

Details of the cable pulling assembly 34, consisting of the traction support assembly 200, to which the operating components are mounted, will now be described with respect to FIGS. 17–30. An operating component package assembly, which is integrated into the traction support assembly 200, is shown at 240. The operating component package assembly 240 consists of the aforementioned drive/hydraulic motor assembly 104, a capstan assembly at 242, and a gear assembly at 244, for transmitting a force from the drive/hydraulic motor assembly 104 to the part 98 of the capstan assembly 242 to cause the part 98 of the capstan assembly 242 to be driven around the axis 102.

The capstan assembly part 98 has an annular shape with an outwardly opening, U-shaped groove 246 formed continuously thereround. The groove 246 is formed in a "wave" pattern fully around the axis 102. In this embodiment, the wave pattern is regular throughout the circumferential extent thereof. It is not required that the pattern be regular or that there be a specific amplitude or length for each wave.

The theory of operation is as follows. In a conventional straight, non-wave groove, the cable 22, under tension, is squeezed radially inwardly into the groove and against a U-shaped surface bounding the same. The traction force between the cable 22 and abutting groove surface is substantially uniform along that portion of the groove surface that is engaged by the cable 22. This force is generated through a wedging action as the cable 22 is drawn radially inwardly.

By using the wave pattern, the cable is caused to bend to nominally match the wave pattern. As the tension on the cable 22 increases, the cable 22 tends to straighten which causes a localized pressure increase between the cable 22 and peaks 248 in the groove shape defined by the wave pattern, thereby enhancing the traction force on the cable 22. The amplitude of each "wave" is thus selected to cause the generation of localized, increased pressure points, throughout the contact length, between the cable and the capstan part 98 at the peaks 248.

Figure 28:
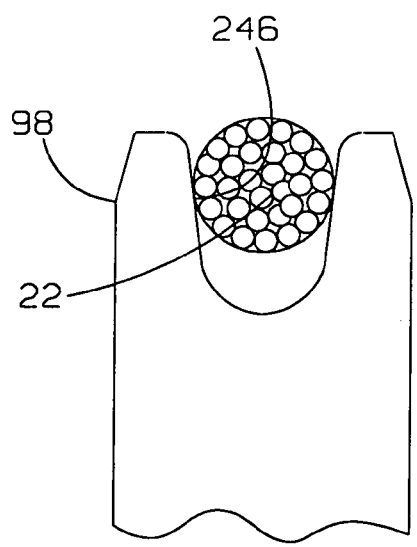
FIG. 28 is an enlarged, fragmentary, schematic representation of the cable-engaging part on the capstan assembly in FIGS. 24 and 25 and showing the cooperation between a cable and the groove on the cable-engaging part.

The cable diameter and flexibility will determine the appropriate amplitude and frequency for each wave. At too great an amplitude and too short a wavelength, it may be difficult to conform the cable to the groove shape. A reduced wavelength and increased amplitude may also result in the cable 22 not properly seating to the desired depth in the groove 246 to benefit from the wedging action along the length. As shown in FIG. 28, this wedging action of the cable 22 in the groove 246 is primarily responsible for the gripping between the cable 22 and capstan part 98. If the wavelength becomes too long, and the amplitude too small, the operating characteristics approach that of a conventional, straight, non-wave groove.

Figure 29:
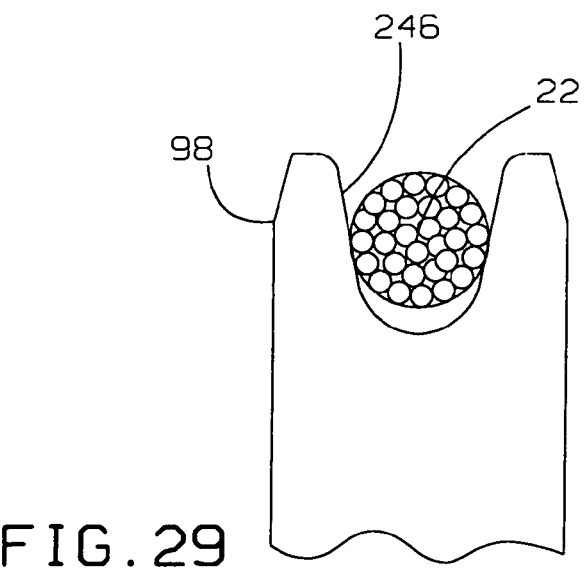
FIG. 29 is a view as in FIG. 28 with either a smaller cable or the cable in FIG. 28 drawn to have an effectively reduced diameter.
Figure 30:
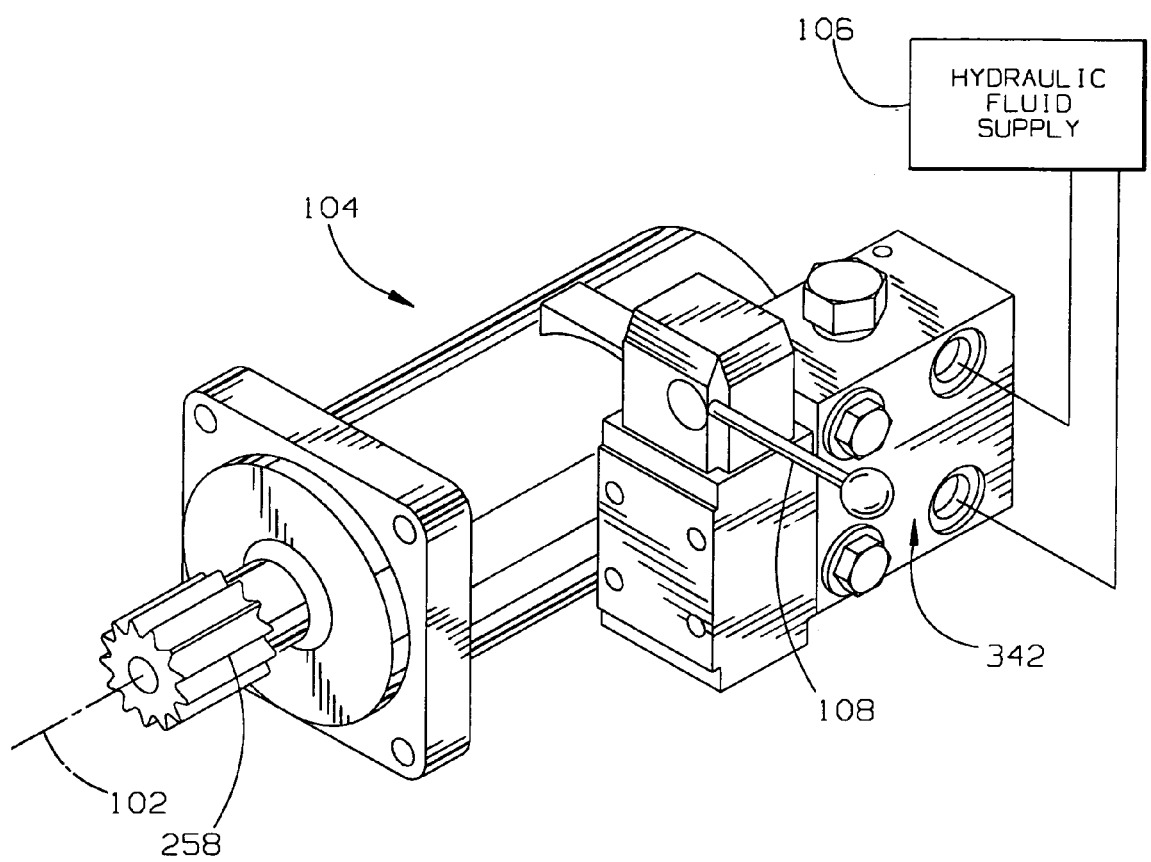
FIG. 30 is an enlarged, perspective view of a drive/hydraulic motor assembly for operating the cable pulling assembly on the apparatus in FIGS. 3–5.

The design also must take into account the fact that as the cable 22 is placed under tension, its effective diameter reduces, as depicted in FIG. 29. Thus, at the reduced diameter, it is desired that there still be a relationship between the cable 22 and groove 246 that permits the requisite wedging action as the cable 22 is pulled in operation.

A typical cable diameter for this application is on the order of 0.75 inch. However, this is a common diameter used in the industry and should not in any be viewed as limiting. If properly designed, the wave groove may account for a substantial increase in traction force over conventional grooves, potentially achieving traction forces similar to those resulting from multiple wraps of the cable 22.

The capstan assembly 242 has a ring gear/annulus 250 with an annular arrangement of inner gear teeth 252 thereon. The annulus 250 is drivingly engaged by the gear assembly 244, which in turn is driven by the drive/hydraulic motor assembly 104. More specifically, the gear assembly 244 is a planetary gear assembly consisting of a sun gear 254 and a plurality, and in this case five, planet gears 256. The number of planet gears 256 could be as few as two or greater than the five shown. The drive/hydraulic motor assembly 104 has an externally toothed output 258 (FIG. 30) which is keyed within a socket 260 on the sun gear 254 so that the sun gear 254 follows rotational movement of the output 258 around the axis 102.

The sun gear 254 has two axially spaced, annular arrays of external teeth at 262,262', which are in mesh with corresponding annular arrays of external teeth 264,264' on each planet gear 256. The teeth 264,264' are in turn in mesh with internal teeth 268,268' on annular ground gears 270, 270'.

Figure 22:
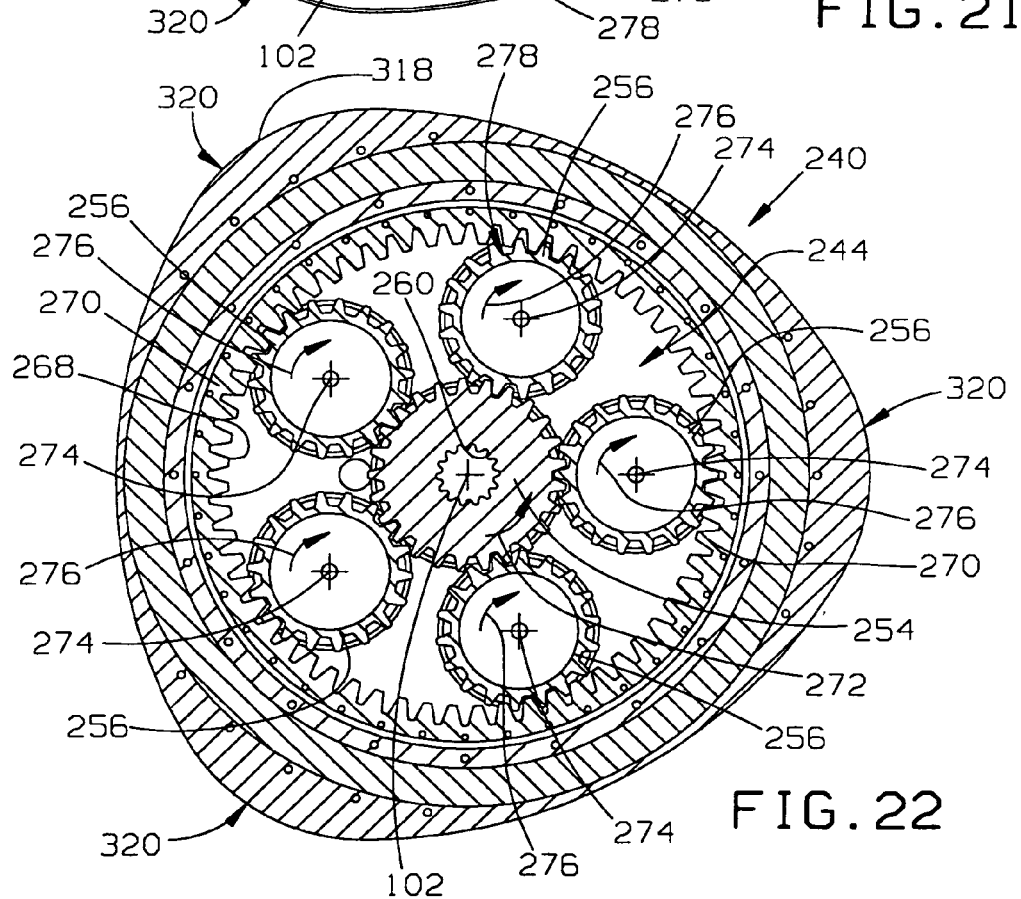
FIG. 22 is an enlarged, cross-sectional view of the operating component package assembly taken along line 22—22 of FIG.19.
Figure 23:
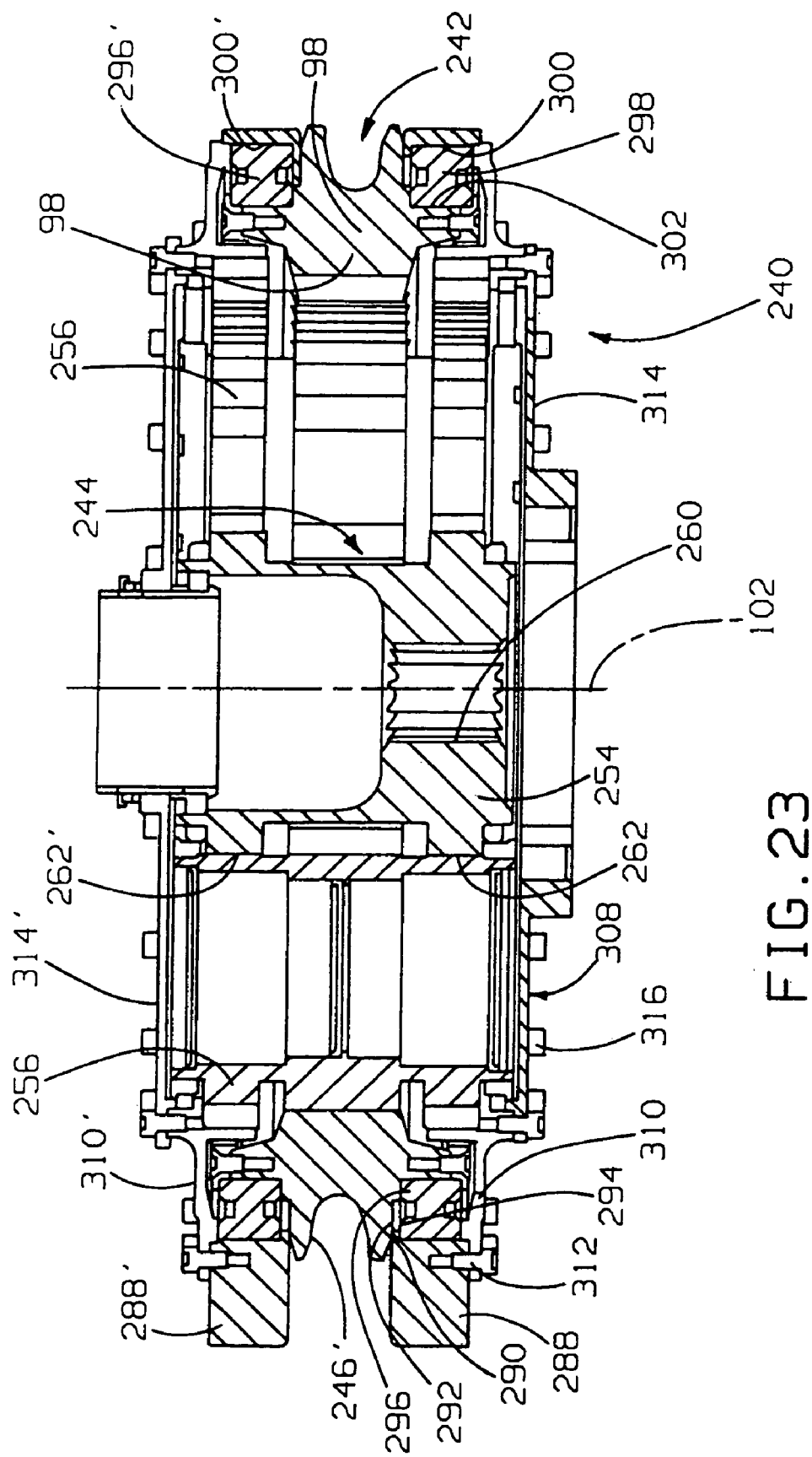
FIG. 23 is a cross-sectional view of the operating component package assembly taken along line 23—23 of FIG. 18.
Figure 24:
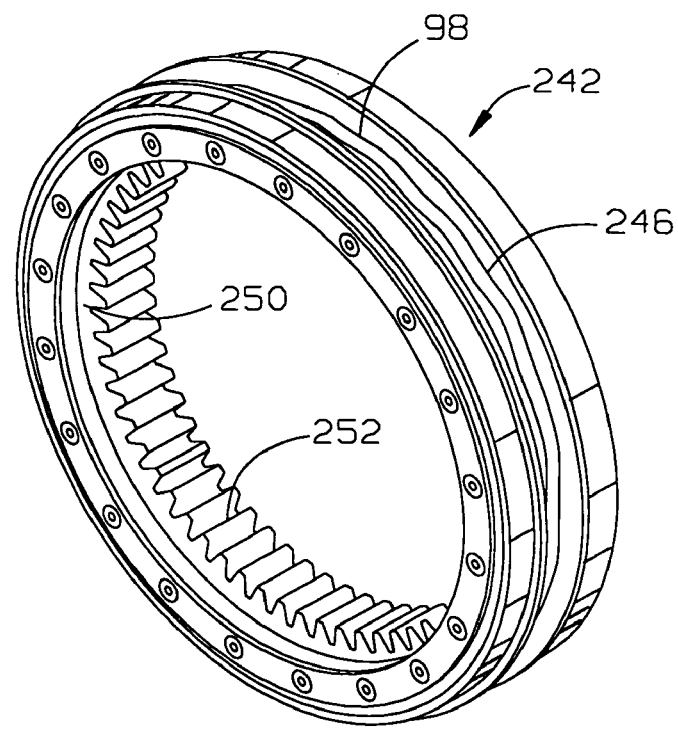
FIG. 24 is an enlarged, perspective view of a capstan assembly that is part of the operating component package assembly of FIGS. 17–23, and including a cable-engaging part with a groove in which a cable is engaged to be advanced by the cable pulling assembly.
Figure 25:
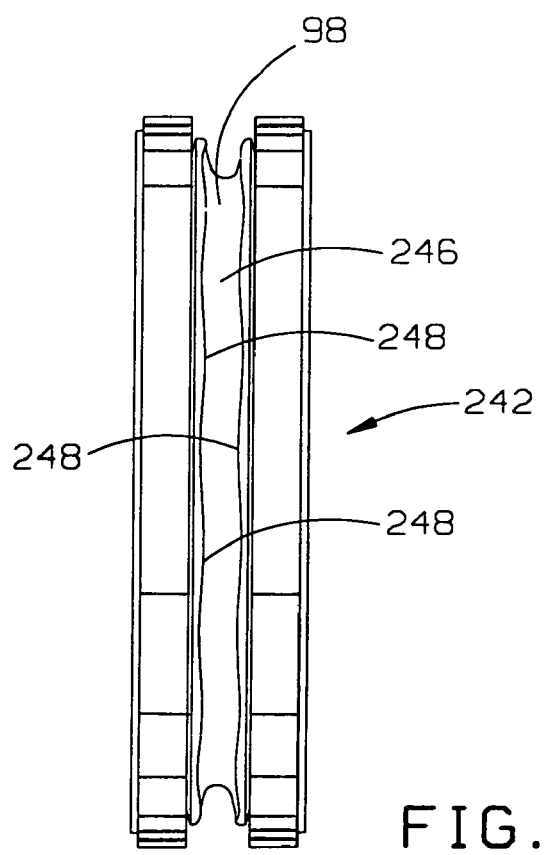
FIG. 25 is a rear elevation view of the capstan assembly in FIG. 24.
Figure 26:
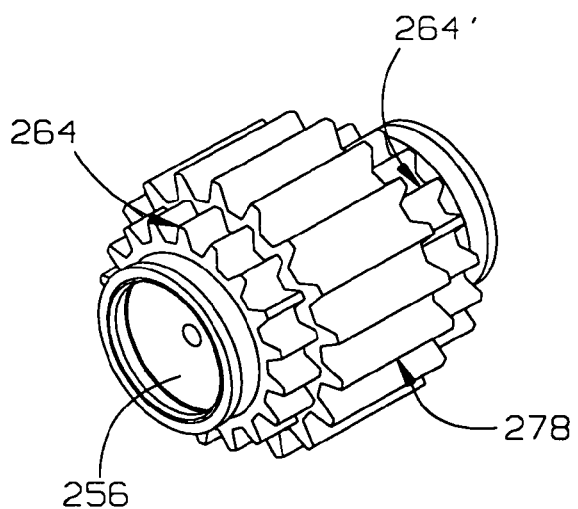
FIG. 26 is an enlarged, perspective view of a planet gear on a planetary gear assembly on the operating component package assembly, for driving the cable-engaging part of the capstan assembly around an axis.
Figure 27:
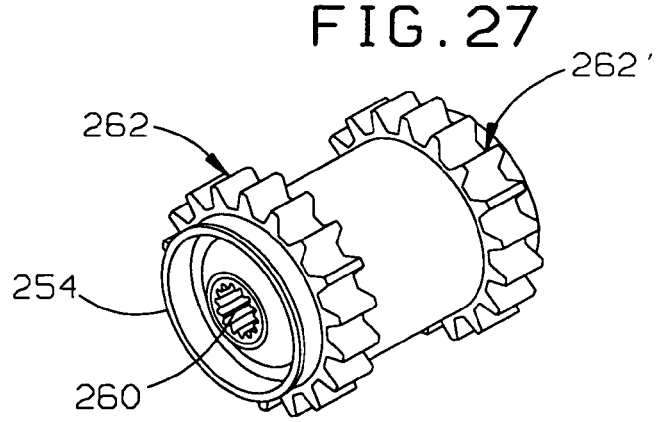
FIG. 27 is an enlarged, perspective view of a sun gear on the planetary gear assembly.

With the sun gear 254 driven in the direction of the arrow 272 in FIG. 22 around the axis 102, the planet gears 256 are caused to be rotated about their respective axes 274 in the direction of the arrows 276. As seen primarily in FIG. 21, as the planet gears 256 move around their axes 274, an annular array of external teeth at 278 on each planet gear 256, between the teeth 264,264', are in mesh with the teeth 252 on the annulus 250, and drive the annulus 250 with the integral cable-engaging part 98 around the axis 102 in the direction of the arrow 280.

The connection of the operating component package assembly 240 to the traction support assembly 200 will now be described. A traction base 288 is placed against an annular, axially facing surface 290 (FIG. 23) on the capstan part 98. The traction base 388 has an annular rim 92 with an axially facing, annular surface 294. The annular surface 294 defines a seat for a ball bearing assembly 296 with roller elements 298 that act between a radially inwardly facing surface 300 on the traction base 288, and a radially outwardly facing surface 302 on the capstan part 98.

A cover assembly 308 is then installed. The cover assembly 308 has a first cover part 310 that is secured by fasteners 312 to the traction base 288. A second cover part 314 on the cover assembly 308 is in turn secured to the first cover part 310 through fasteners 316. Appropriate sealing elements, such as those shown at 317, 317' in FIG. 20, and well known to those skilled in the art, can be interposed between the components. The detail of these sealing elements will not be described herein.

The traction base 288 has a peripheral edge 318 which is generally in the shape of a triangle with three rounded apices 320. The traction support plate 202 on the traction support assembly 200 has an opening 322 formed therethrough that is nominally matched to the shape of the peripheral edge 318. The traction support plate 202 has formed receptacles at 324, each designed to receive one of the apices 320 on the traction base 288. Each receptacle 324 is bounded by a curved surface 326 which converges towards the center 328 of the opening 322. The traction base 288 is directed into the opening 322 in an axial direction to bring the apices 320 into contact, one each, with the surfaces 326 at each receptacle 324. By urging the surfaces 326 and traction base 288 axially against each other, a wedging action is produced therebetween so that the traction base 288 and traction support plate 202 become preliminarily held against relative pivoting around the axis 102. A more positive keying against relative pivoting movement is achieved by reason of the matching triangular shapes of the traction base peripheral edge 318 and the opening 322 in the traction support assembly 200. With the traction base 288 preassembled in this manner, mounting clips 330 can be attached to the traction support plate 202 to loosely, captively, maintain the traction base 288 in a preassembly position relative to the traction support assembly 200.

The traction support assembly can then be oriented with the loosely held traction base 288. The mounting clips 330 prevent the traction base 288 from axially separating from the traction support assembly 200. For convenience of assembly the traction support assembly 200 can be oriented with the traction base 288 held loosely thereto, so that the traction support plate 202 faces downwardly.

The remaining components are assembled from the side of the traction support plate 204 to captively embrace the traction support assembly 200. More specifically, a corresponding traction base 288', ball bearing assembly 296', first cover part 310' and second cover part 314' are sequentially installed in the same manner as the corresponding parts on the other side of the traction support assembly 200, as previously described.

The traction support plate 204 has a construction corresponding to the traction support plate 202, with receptacles 324' to receive apices 320' on the traction base 288'. The receptacles 324' have surfaces 326' corresponding in shape and function to the surfaces 326.

With the operating component package assembly 240 fully assembled around the traction support assembly 200, the surfaces 326, 326' are captive between the traction bases 288, 288'. At the same time, the operating component package assembly 240 is confined against relative rotation around the axis 102 by reason of the keyed connection between the peripheral edge 318 of the traction base 288 within the opening 322 and a like keying arrangement between a corresponding peripheral edge 318' on the traction base 288 and a corresponding opening 322' on the traction support plate 204.

Another aspect of the present invention is the provision of a cable tensioning assembly, as shown at 332 in FIGS. 9–12. The cable tensioning assembly 332 includes a cantilevered support 334 which carries, at its free end, a roller 336 for movement about a horizontally extending axis 338. The roller 336 is aligned with the groove 246 in the capstan part 98. As the cable pulling assembly 34 is pivoted from the preassembly position, shown in solid lines in FIG. 16, to the operative position, the roller 336 moves into the groove 246 at approximately the 8 o'clock position in FIG. 4. During operation, the roller 336 acts against the cable 22 to locally urge the cable 22 radially inwardly into the groove 246 to enhance the traction force production on the cable 22 by the capstan part 98. As the cable tension is increased, the cable pulling assembly 34 is pressed with an increasing force towards the roller 336 to increase the force produced by the roller 336 on the cable 22.

With the apparatus 12 set up, the cable 22, having the mole 26 attached thereto, is directed through the reaction plate 66, the reaction cage 68, and an opening 340 (FIG. 12) in the frame 64. The cable 22 is wrapped in the pattern shown in FIG. 4 around the capstan part 98 beginning at the 12 o'clock position and extending through 270° to approximately the 9 o'clock position, whereat the cable departs from the capstan part 98 and projects vertically upwardly for appropriate accumulation, at a location which is above ground in the FIG. 1 arrangement. By manipulating the actuator 108 on the drive/hydraulic motor assembly 104, valving on a valve block assembly 342 is placed in a state to cause driving of the output 258, which thereby actuates the planetary gear assembly 244 to rotate the capstan part 98 around the axis 102. The drive/hydraulic motor assembly 104 can be continuously operated to produce a constant pulling force on the cable 22 to cause the mole 26 to move a substantial distance D1 through the composition 14, and preferably the entire distance D between the first and second locations 16, 18. The switch assembly 110 will automatically cause a bypass valve to divert flow of the hydraulic fluid at the valve block 342 to interrupt the pulling force once the mole 26 has reached a predetermined position.

It should be understood that the above structure is exemplary in nature only. The invention contemplates modifications to all different aspects of the structure disclosed.

As just one example, the receptacles 218, 218', shown on the frame 64, could be formed on the cable pulling assembly 34, to cooperate with an appropriate projection on the frame 64 to allow the requisite relative pivoting movement between the frame 64 and cable pulling assembly 34.

While the construction of the planetary gear assembly 244 may be designed in many different ways by those skilled in this art, in one form, the planetary gear assembly 244 is made as outlined in NASA Tech Brief GSC-14207.

The foregoing disclosure of specific embodiments is intended to be illustrative of the broad concepts comprehended by the invention.

The invention claimed is:

1. A method of advancing a mole to define a passageway through a composition between first and second locations spaced from each other a substantial first distance, the method comprising the steps of:
attaching the mole to a cable;
providing a support;
placing the support against an upwardly facing surface;
bearing the support against a vertically extending surface with the support remaining against the upwardly facing surface;
providing a cable pulling assembly on the support; and
operating the cable pulling assembly to: a) cause a pulling force on the cable to be continuously applied through the cable pulling assembly to the cable and therethrough to the mole to thereby cause the mole to be advanced in a path a substantial second distance at least partially over the first distance between the first and second locations; and b) produce a reaction force to the pulling force through the support upon the vertically extending surface.

2. The method of advancing a mole to define a passageway according to claim 1 wherein the step of operating the cable pulling assembly comprises operating the cable pulling assembly to cause the pulling force on the cable to be continuously applied as the mole is advanced over the entire first distance between the first and second locations.

3. The method of advancing a mole to define a passageway according to claim 1 wherein the step of providing a cable pulling assembly comprises providing a cable pulling assembly comprising a drive, a gear assembly, and a capstan assembly, the drive operable to operate the gear assembly to cause at least a part of the capstan assembly to be driven around a first axis so as to cause the cable to be engaged and pulled by the part of the capstan assembly as the part of the capstan assembly is driven around the first axis, wherein the support has a top and bottom and the first axis resides below the top of the support.

4. The method of advancing a mole to define a passageway according to claim 3 wherein the step of providing a gear assembly comprises providing a gear assembly comprising a sun gear that is driven by the drive and at least one planet gear that is drivingly engaged between the sun gear and the part of the capstan assembly.

5. The method of advancing a mole to define a passageway according to claim 1 wherein the step of providing a support comprises providing a support that acts between the composition and the cable pulling assembly and that transfers directly to the composition a reaction force generated by the cable pulling assembly as the cable pulling assembly is operated.

6. The method of advancing a mole to define a passageway according to claim 5 wherein the step of providing a support comprises providing a support comprising a reaction plate with an enlarged, substantially flat surface, that is borne against the composition at the second location.

7. The method of advancing a mole to define a passageway according to claim 6 wherein the step of providing a support comprises providing a support comprising a frame to which the cable pulling assembly is releasably attached and a reaction cage acting between the frame and the reaction plate.

8. The method of advancing a mole to define a passageway according to claim 1 further comprising the step of releasably attaching the cable pulling assembly to the support in an operative position by: a) relatively repositioning the cable pulling assembly and support without requiring use of any separate fasteners to maintain the cable pulling assembly attached to the support in the operative position; and b) guidingly pivoting the cable pulling assembly relative to the support from a preassembly position into the operative position.

9. The method of advancing a mole to define a passageway according to claim 1 further comprising the step of causing operation of the cable pulling assembly to be automatically stopped as an incident of the mole being advanced to a predetermined position relative to the cable pulling assembly.

10. The method of advancing a mole to define a passageway according to claim 1 further comprising the step of causing a conduit to follow movement of the mole from the first location to the second location whereby a continuous passageway is defined by the conduit between the first and second locations.

11. The method of advancing a mole to define a passageway according to claim 1 wherein the step of providing a cable pulling assembly comprises providing a cable pulling assembly comprising a capstan assembly comprising an annular cable-engaging part and a drive that is operable to move the cable-engaging part around a first axis so that the cable is engaged by the cable-engaging part and pulled as the cable-engaging part is moved around the first axis.

12. The method of advancing a mole to define a passageway according to claim 11 further comprising the step of bearing the cable against the cable-engaging part of the capstan assembly through in excess of 180° around the first axis.

13. The method of advancing a mole to define a passageway according to claim 11 further comprising the step of bearing the cable against the cable-engaging part of the capstan assembly through on the order of 270° around the first axis.

14. The method of advancing a mole to define a passageway according to claim 11 further comprising the step of locally exerting a radial force on the cable through a roller as the drive is operated to urge the cable toward the cable-engaging part of the capstan assembly.

15. An apparatus for defining a passageway through a composition between first and second spaced locations, the apparatus comprising:
a cable pulling assembly; and
a support for the cable pulling assembly,
the support comprising at least one downwardly facing support surface to bear against an upwardly facing surface to thereby maintain the apparatus in an operative position,
the support further comprising a reaction plate to bear on a vertically extending surface with the downwardly facing support surface bearing against an upwardly facing surface to transfer a reaction force generated during operation of the cable pulley assembly,
the cable pulling assembly operable by a drive that is operable to cause a pulling force on a cable to be continuously applied so that a mole attached to a cable can be moved under a force continuously applied to the cable through a composition between first and second spaced locations.

16. The apparatus for defining a passageway through a composition between first and second spaced locations according to claim 15 further in combination with a cable and a mole attached to the cable.

17. The apparatus for defining a passageway through a composition between first and second spaced locations according to claim 16 further in combination with a conduit with an internal passageway that is engaged by the mole to follow movement of the mole as the mole is moved through the cable pulling assembly.

18. The apparatus for defining a passageway through a composition between first and second spaced locations according to claim 15 wherein the cable pulling assembly comprises a capstan assembly with an annular cable-engaging part and a gear assembly operatively engaged between the drive and the cable-engaging part to cause the cable-engaging part to be driven around a first axis.

19. The apparatus for defining a passageway through a composition between first and second spaced locations according to claim 18 wherein the gear assembly comprises a sun gear that is driven by the drive around the first axis and at least one planet gear that is drivingly engaged between the sun gear and the cable-engaging part of the capstan assembly.

20. The apparatus for defining a passageway through a composition between first and second spaced locations according to claim 19 wherein the gear assembly comprises a plurality of planet gears each drivingly engaged between the sun gear and the cable-engaging part of the capstan assembly.

21. The apparatus for defining a passageway through a composition between first and second spaced locations according to claim 15 wherein the a reaction plate has an enlarged, substantially flat surface that can be borne against a composition to transfer a reaction force generated by the cable pulling assembly to a composition, through which a passageway is being formed, as the cable pulling assembly is operated.

22. The apparatus for defining a passageway through a composition between first and second spaced locations according to claim 21 wherein the support further comprises a frame to which the cable pulling assembly is attached and a reaction cage acting between the frame and the reaction plate.

23. The apparatus for defining a passageway through a composition between first and second spaced locations according to claim 22 wherein the cable pulling assembly is releasably attached to the frame in an operative position.

24. The apparatus for defining a passageway through a composition between first and second spaced locations according to claim 23 wherein the cable pulling assembly is reteasably attached to the frame by relatively repositioning the cable pulling assembly and frame, and the cable pulling assembly can be changed from a position fully separated from the frame into the operative position and maintained in the operative position without requiring any separate fasteners.

25. The apparatus for defining a passageway through a composition between first and second spaced locations according to claim 22 wherein the reaction cage is releasably connected to each of the reaction plate and the frame.

26. The apparatus for defining a passageway through a composition between first and second spaced locations according to claim 15 wherein the cable pulling assembly comprises a capstan assembly with an annular cable-engaging part that is driven around a first axis to cause a pulling force to be exerted by the cable-engaging part on a cable, wherein the support has a top and bottom and the first axis resides below the top of the support.

27. The apparatus for defining a passageway through a composition between first and second spaced locations according to claim 26 wherein the cable pulling assembly is repositionable relative to the support and further comprising a cable tensioning assembly on the support for locally biasably exerting a radial force on a cable engaged by the cable-engaging portion.

28. The apparatus for defining a passageway through a composition between first and second spaced locations according to claim 26 in combination with a cable wherein the cable bears against the cable-engaging part through at least 180° around the first axis.

29. The apparatus for defining a passageway through a composition between first and second spaced locations according to claim 26 in combination with a cable wherein the cable bears against the cable-engaging part through on the order of 270° around the first axis.

30. The apparatus for defining a passageway through a composition between first and second spaced locations according to claim 15 wherein the drive is hydraulically operated.

31. The apparatus for defining a passageway through a composition between first and second spaced locations according to claim 15 further comprising a switch assembly, the switch assembly causing the drive to be disabled automatically as an incident of a mole being advanced to a predetermined position relative to the cable pulling assembly.

32. The apparatus for defining a passageway through a composition between first and second spaced locations according to claim 15 wherein the first location resides within a passageway below ground level and the step of operating the cable pulling assembly comprises operating the cable pulley assembly with the entire cable pulley assembly below ground level within the passageway.

33. An apparatus for defining a passageway through a composition between first and second spaced locations, the apparatus comprising:
a cable pulling assembly; and
a support for the cable pulling assembly,
the cable pulling assembly operable by a drive that is operable to cause a pulling force on a cable to be continuously applied so that a mole attached to a cable can be moved under a force continuously applied to the cable through a composition between first and second spaced locations,
wherein the support comprises a reaction plate with an enlarged, substantially flat surface that can be borne against a composition to transfer a reaction force generated by the cable pulling assembly to a composition, through which a passageway is being formed, as the cable pulling assembly is operated,
wherein the support further comprises a frame to which the cable pulling assembly is attached and a reaction cage acting between the frame and the reaction plate,
wherein the cable pulling assembly is releasably attached to the frame in an operative position,
wherein the cable pulling assembly is releasably attached to the frame by relatively repositioning the cable pulling assembly and frame, and the cable pulling assembly can be changed from a position fully separated from the frame into the operative position and maintained in the operative position without requiring any separate fasteners, wherein there are a cooperating projection and receptacle, one each on the cable pulling assembly and frame, the projection defining a pivot axis, and the cable pulling assembly is changeable from a pre-assembly position into the operative position by pivoting movement of the cable pulling assembly around the pivot axis.

34. The apparatus for defining a passageway through a composition between first and second spaced locations according to claim 33 wherein the receptacle is U-shaped and opens upwardly.

35. The apparatus for defining a passageway through a composition between first and second spaced locations according to claim 34 wherein there is a graspable handle on the cable pulling assembly that can be grasped and repositioned to facilitate repositioning of the cable pulling assembly relative to the frame.

36. The apparatus for defining a passageway through a composition between first and second spaced locations according to claim 34 wherein the cable pulling assembly further comprises a bearing element spaced from the pivot axis and with the cable pulling assembly in the operative position the bearing element abuts to the support to transfer a reaction force generated by the cable pulling assembly to the support as the cable pulling assembly is operated.

37. The apparatus for defining a passageway through a composition between first and second spaced locations according to claim 36 wherein the projection is on the cable pulling assembly and abuts to the support simultaneously as the bearing element abuts to the support with the cable pulling assembly in the operative position so that the bearing element and projection cooperatively transfer the reaction force generated by the cable pulling assembly to the support as the cable pulling assembly is operated.

38. The apparatus for defining a passageway through a composition between first and second spaced locations according to claim 37 wherein the support has a U-shaped receptacle bounded by an edge to which the bearing element abuts.

* * * * *